United States Patent
Arita et al.

(10) Patent No.: US 6,695,443 B2
(45) Date of Patent: Feb. 24, 2004

(54) INK FOR INK JET RECORDING, INK SET FOR INK JET RECORDING, METHOD FOR INK JET RECORDING, INK CARTRIDGE FOR INK JET RECORDING, INK JET RECORDING APPARATUS AND RECORDED ARTICLE

(75) Inventors: Hitoshi Arita, Yokohama (JP); Kiyofumi Nagai, Machida (JP); Akihiko Gotoh, Atsugi (JP); Akiko Bannai, Tokyo (JP); Tetsuya Kaneko, Yokohama (JP); Nobutaka Osada, Mishima (JP); Tomoko Maeda, Saitama (JP); Masayuki Koyano, Zama (JP); Kakuji Murakami, Atsugi (JP); Toshiroh Tokuno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/156,103

(22) Filed: May 29, 2002

(65) Prior Publication Data

US 2003/0107632 A1 Jun. 12, 2003

(30) Foreign Application Priority Data

| May 29, 2001 | (JP) | 2001-160955 |
| Jul. 6, 2001 | (JP) | 2001-206230 |
| Sep. 20, 2001 | (JP) | 2001-286320 |
| Sep. 21, 2001 | (JP) | 2001-290051 |
| Nov. 22, 2001 | (JP) | 2001-358147 |

(51) Int. Cl.$^7$ ................................. B41J 2/01
(52) U.S. Cl. .................... 347/100; 347/101; 347/95; 106/31.13
(58) Field of Search .................. 347/100, 96, 101, 347/95; 106/31.13, 31.6, 31.27

(56) References Cited

U.S. PATENT DOCUMENTS

| 442,869 A | 12/1890 | Dunn et al. |
| 5,619,765 A | 4/1997 | Tokita et al. |

(List continued on next page.)

FOREIGN PATENT DOCUMENTS

| EP | 0697445 A2 | * 2/1996 | ........... C09D/11/00 |
| EP | 0 697 445 | 2/1996 | |
| EP | 0 943 666 | 9/1999 | |
| EP | 0943666 A2 | * 9/1999 | .............. B41J/2/01 |

OTHER PUBLICATIONS

U.S. patent application Ser. No. 10/050,942, filed Jan. 22, 2002, pending.

(List continued on next page.)

*Primary Examiner*—Stephen D. Meier
*Assistant Examiner*—Manish Shah
(74) *Attorney, Agent, or Firm*—Oblon, Spivak, McClelland, Maier & Neustadt, P.C.

(57) ABSTRACT

An ink for ink jet recording and an ink jet recording method which realize an image quality of laser printer on a plain paper in a one-pass printing mode under conditions of a volume of an ink droplet ejected being 5 to 43 Pico liter, a velocity of an ink droplet being 6 to 20 m/sec, frequency of 1 kHz and resolution of 300 dpi or more. The ink for ink jet recording is a penetrating type ink which includes (1) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane, (2) colorant contained in the amount of 6% by weight or more, (3) a polyol having 8 to 11 carbon atoms and glycolether, and an anionic surfactants or non-ionic surfactants, the ink has viscosity of 5 mPa·s or more at 25° C. and a surface tension of 40 mN/m or less.

43 Claims, 4 Drawing Sheets

U.S. PATENT DOCUMENTS

| | | | |
|---|---|---|---|
| 5,622,550 A | | 4/1997 | Konishi et al. |
| 5,782,254 A | | 7/1998 | Tanikawa et al. |
| 5,810,915 A | | 9/1998 | Nagai et al. |
| 5,851,717 A | | 12/1998 | Tsubuko et al. |
| 5,879,439 A | | 3/1999 | Nagai et al. |
| 5,882,390 A | | 3/1999 | Nagai et al. |
| 5,968,301 A | | 10/1999 | Murakami et al. |
| 5,972,082 A | | 10/1999 | Koyano et al. |
| 5,993,524 A | | 11/1999 | Nagai et al. |
| 6,020,103 A | | 2/2000 | Tsubuko et al. |
| 6,027,210 A | * | 2/2000 | Kurabayashi et al. ....... 347/100 |
| 6,120,589 A | | 9/2000 | Bannai et al. |
| 6,204,307 B1 | * | 3/2001 | Miyabayashi ............. 106/31.6 |
| 6,231,652 B1 | | 5/2001 | Koyano et al. |
| 6,261,349 B1 | | 7/2001 | Nagai et al. |
| 6,328,393 B1 | * | 12/2001 | Lin et al. ........................ 347/1 |
| 6,502,915 B1 | * | 1/2003 | Feinn et al. ................... 347/12 |

OTHER PUBLICATIONS

U.S. patent application Ser. No. 10/098,547, filed Mar. 18, 2002, pending.

U.S. patent application Ser. No. 10/103,729, filed Mar. 25, 2002, pending.

U.S. patent application Ser. No. 10/102,890, filed Mar. 22, 2002, pending.

U.S. patent application Ser. No. 09/894,778, filed Jun. 29, 2001, pending.

U.S. patent application Ser. No. 09/662,866, filed Sep. 15, 2000, pending.

U.S. patent application Ser. No. 09/359,913, filed Jul. 26, 1999, pending.

U.S. patent application Ser. No. 10/156,103, filed May 29, 2002, pending.

U.S. patent application Ser. No. 10/005,606, filed Dec. 7, 2001, pending.

U.S. patent application Ser. No. 09/966,907, filed Oct. 1, 2001, pending.

U.S. patent application Ser. No. 10/156,103, filed May 29, 2002, pending.

* cited by examiner

INK FOR INK JET RECORDING, INK SET FOR INK JET RECORDING, METHOD FOR INK JET RECORDING, INK CARTRIDGE FOR INK JET RECORDING, INK JET RECORDING APPARATUS AND RECORDED ARTICLE

BACKGROUND OF THE INVENTION

1. Field of the Invention

The present invention relates to an ink for ink jet recording and an ink set for ink jet recording to be used in a recording of information containing characters, images, symbols, and the like, particularly, on plain paper copier (PPC) paper by an ink jet recording apparatus and a method for ink jet recording using the ink for ink jet recording, an ink cartridge for ink jet recording, an ink jet recording apparatus and the recorded article.

2. Description of the Related Art

The ink jet recording is known as an excellent method of recording which do not restrict the types of recording medium being used and research and studies of recording apparatuses, recording techniques, recording material for this method has been actively pursued. However, in practice, in case of ink jet recording apparatuses which have been developed and are now commercially available, when a recording medium which has been uniquely designed for ink jet recording is not used, it is difficult to obtain an image 1) having a good fixation, 2) having a so-called good "sharpness" in characters and free of fogging and blurring (hereinafter referred to as "feathering"), and 3) having a high image density or Optical Density (OD). When recording is performed on a recording medium, for example, paper commonly used in offices and homes such as plain paper copier paper, letter paper, bond paper, post card, writing paper, envelope, report paper, etc. and transparency films (OHP film) by a conventional ink jet recording apparatus, it is impossible to satisfy all of the properties aforementioned at the same time.

If a paper designed uniquely for ink jet recording is used, an image which exhibits aforementioned properties may be achieved. However, in general, the paper designed for ink jet recording is expensive. Also, since the paper is usually a coated paper only on its one side, fixation of ink and printing quality significantly deteriorates when recording is performed on the backside of the paper where no coating is applied. Such problem is one obstacle factor to prevent the ink jet recording apparatus to become widely used.

Therefore, various attempts to achieve the foregoing properties 1) to 3) has been pursued. For example, the following techniques have been disclosed.

(1) Strong alkaline inks exhibiting pH of around 13 as described in Japanese Patent Application Laid Open No.56-57862, Japanese Patent Application Laid Open No.57-102970 and Japanese Patent Application Laid Open No.57-102971.

(2) Method for recording which utilizes an ink ejected in a molten state, in which the molten ink is obtained by heating a solid ink in a form of wax under room temperature (for example, Japanese Patent Application Laid Open No.61-159470, Japanese Patent Application Laid Open No.62-48774 and Japanese Patent Application Laid Open No.56-57862), (3) Method for recording which utilizes an oil-soluble ink in which a non-water-soluble organic solvent is used as a liquid medium.

Also, the following techniques are disclosed to achieve excellent fixation of the aforementioned property 1).

(4) An ink containing a large amount of surfactant, as described in Japanese Patent Application Laid Open No.55-29546.

(5) An ink comprising a combination of glycerin, N-methyl-2-pyrrolidone, a direct dye and a surfactant having a low surface tension less than cmc, as described in Japanese Patent Application Laid Open No.56-49771.

(6) Inks having a high pH and containing a fluoride surfactant, as described in Japanese Patent Application Laid Open No.56-57862 and Japanese Patent Application Laid Open No.57-102971.

The ink as aforementioned in (1) is very hazardous in handling due to the high pH. It is possible to achieve a print of excellent quality and fixation on acid paper prepared by using rosin as a sizing agent. However, ink fixation considerably deteriorates when recording on neutral papers which utilize alkyl ketene dimer or anhydride stearic acid that have recently increased production amount in Japan. Further, printing quality slightly drops. Moreover, since the strong alkaline ink can penetrate into the paper, off-setting occurs and becomes very difficult to perform two-sided printing.

The techniques as aforementioned in (2) are excellent methods satisfying the foregoing 1) to 3) properties. However, they are known to have defects that printed portions swell up, and when storing print outs by putting one upon another in a pile, the printed items can be transferred to another sheet and paper sheets can stick to each other. Also, since a separate device is required for heating the ink, the entire configuration of the recording apparatus becomes complicated.

The conventional technique as aforementioned in (3) can provide a print with excellent ink fixation. However, an offensive odor of the organic solvent contained in the ink is a troublesome matter and consideration for safety is also necessary. Therefore, they are only used for industrial application such as printing of lot numbers on the bottom of containers and outside the boxes, and rarely used in offices or at home.

The conventional technique which uses the ink aforementioned in (4) is not considered as a good technique due to the printing quality as clearly disclosed in Japanese Patent Application Laid Open No.55-80477 and Japanese Patent Application Laid Open No.56-49771.

The technique which uses the ink aforementioned in (5) has a drying rate (fixation) of 8 to 15 seconds after printing as shown in Examples. Such data clearly demonstrates that the ink is excellent in fixation as compared to the conventional art. However, when the practical situation is considered in using a recording apparatus, the time 8 to 5 seconds is found very long. Also, when holding the print outs directly after being printed out from the printing apparatus, hands of operators may be stained. In some papers, significant feathering may occur. Therefore, there are demands for improvement.

The ink of (6) is, as the present inventors confirmed, excellent ink having a fixation time of less than 5 seconds. However, it has problems with the safety, fixation and printing quality on neutral paper, off-setting, as described in the aforementioned technique (1).

In general, for use in the office or at home, aqueous inks are preferred in terms of offensive odor, safety and handling. However, when using the aqueous inks, feathering tends to occur in the portions of recording medium, where stains such as fingerprints and the like stick. Also, the printing quality may significantly change between the front and the rear of the paper. Therefore, great care is required in handling recording media when placing the recording media on an ink jet recording apparatus.

Further, as is conventionally well known, when printing by an multi-nozzle ink jet recording apparatus using an aqueous ink including 1 to 5% by weight of an aqueous dye and 20 to 50% by weight of a water-soluble organic solvent such as glycols and having a surface tension of 40 to 55 mN/m, water contained in the ink may evaporate from the nozzles. Even during the printing operation, a nozzle which are not used for printing can be clogged. For example, when printing a numeral "1" after repetitively printing the "-"s for about 120 seconds, "1" may not correctly be printed, since while printing "-"s, nozzles which are not used in printing have been clogged, and thus the ink cannot be uniformly ejected from all the nozzles.

Furthermore, when leaving the recording apparatus without printing for a while (for example, during a weekend), the viscosity of the ink is increased due to water evaporation in the ink and causes frequent ejection failure. For this reason, the apparatus should always be cleaned before using and users feel reluctant and inconvenient over this operation. Such ejection failure is more frequently observed in a recording apparatus having a weak energy used to eject the ink. Thus, in a bubble jet recording apparatus which has an ejecting energy less than ink jet apparatus using a piezo element, ejection failure occurs more frequently. Various methods to solve this problem have been considered. One of them is to install a recovery device such as a cap or pump in the recording apparatus. However, such additional components ultimately cause to raise the price of the ink jet recording apparatus.

In addition to the properties 1) to 3), the following properties are also demanded.

4) To obtain an image which do not cause blurring (color breeding) on the boundaries between different colors,
5) To obtain an image having less off-setting, to withstand two-sided printing,
6) To obtain an image having excellent durability such as water resistance, light resistance.

In order to address the demands and to improve compatibility of the ink to plain paper, aqueous inks using a pigment as a colorant has been proposed. When printing with colorant-containing aqueous ink on plain paper, an image with excellent durability can be produced. However, as for off-setting, it is still not satisfactory in two-sided printing, although it is superior to dye-containing aqueous ink. In order to use a colorant in aqueous ink as a colorant, it is important to stably disperse the colorant in an aqueous medium. Generally, colorants have poor dispersibility. Therefore, some measures are taken, in which a dispersant is added to disperse colorant in an aqueous medium, thereby forming a homogenous dispersion. However, in spite of using such dispersant, satisfying dispersion is not obtained. Furthermore, in storage over a long period of time, the dispersion is destroyed and thus, such types of aqueous ink have a problem in terms of storage stability.

Meanwhile, in order to be used in the ink jet recording, it is necessary that an ink should have properties by which it can ejected in stable liquid droplets from micro ends of an ink jet recording head. Also, the ink should not be solidified by dehydration of an orifice of the ink jet recording head. However, when using ink containing a dispersant, resins forming the dispersant may be bonded to parts of the ink jet recording head such as orifices. If the resins are not redissolved, problems such as clogging of the recording head and ejection failure may be caused. Especially, when the recording head is not used for a long period of time, the head tends to be clogged easily. Also, the ink may accumulate in supporting devices such as a nozzle cap or sucking tube, possibly causing damage to their functions. When the printing is once intermitted, or a nozzle corresponding to blank spaces of a document or image does not perform printing for a while, the ejecting direction of ink droplets may be scattered. So-called bad printing (intermittent ejection failure) may occur. Moreover, the aqueous colorant ink containing a dispersant is typically viscose and dense. Therefore, in case of a continuous printing or a high-speed printing, the ink may encounter a resistance on its way to a nozzle end. As a result, ejection becomes unstable and the printing cannot be performed smoothly.

Regarding the above mentioned problems, many techniques have been proposed. For example, Japanese Patent Application Laid Open No.5-186704 and Japanese Patent Application Laid Open No.8-3498 disclose black inks containing a self-dispersible carbon black, in which the carbon black has a hydrophilic group introduced on its surface, and allows stable dispersion without a dispersant. Japanese Patent Application No. 2000-513396 disclosed color inks containing colorants which can be stably dispersed without a dispersant.

However, the ink of Japanese Patent Application No.2000-513396 does not provide solution to the intermittent ejection failure. Therefore, the conventional color colorant inks, including the self-dispersible colorant ink cannot provide colorant content sufficient for high quality image. Also, even when combined with an ink composition having a penetration rate sufficiently high for use in the high-speed printing on plain paper an image with good color tone and image density cannot be obtained.

SUMMARY OF THE INVENTION

Thus, an object of the present invention is to provide an excellent ink for ink jet recording, ink set for ink jet recording, a method for ink jet recording, an ink jet recording apparatus and an ink cartridge, and recorded article for which 1) the recording medium is not restricted, that is, not affected by the surface properties, materials and construction of the paper, film, and the like; 2) a high image density (OD) can be obtained; 3) high quality print outs can be obtained without hardly causing feathering; 4) exhibit excellent fixation of an ink; and 5) accurate print outs highly reliable may be obtained at any time without a support of complex recovery device.

Another object of the present invention is to provide an excellent ink for ink jet recording, ink set for ink jet recording, a method for ink jet recording, an ink jet recording apparatus and an ink cartridge, characterized by the following properties: 1) excellent ejection stability when printed under high speed on plain paper particularly by a method for ink jet recording and which renders excellent storage stability; 2) good color tone; 3) high image density; 4) an accurate and clear image without causing fogging or blurring (hereinafter referred to as "feathering") at peripheral of the characters or images; 5) causing much less blurring (color breeding) on the interfaces between different colors; 6) less off-setting, thereby allowing two-sided printing; and 7) durability of the produced image in terms of water resistance, resistance to light, and the like.

Yet another object of the present invention is to provide a stable ink for ink jet recording, a method for ink jet recording, an ink jet recording apparatus and an ink cartridge, which perform smooth and natural reproduction of complicated Chinese characters, slant lines or curves.

Yet another object of the present invention is to provide an ink for ink jet recording, ink set for ink jet recording, a method for ink jet recording, an ink jet recording apparatus and an ink cartridge, which allows printing of an image having excellent water resistance.

BRIEF DESCRIPTION OF THE DRAWINGS

The above objects, and other features and advantages of the present invention will become more apparent after reading the following detailed description when taken in conjunction with the drawings.

DESCRIPTION OF THE PREFERRED EMBODIMENTS

Figure 1:
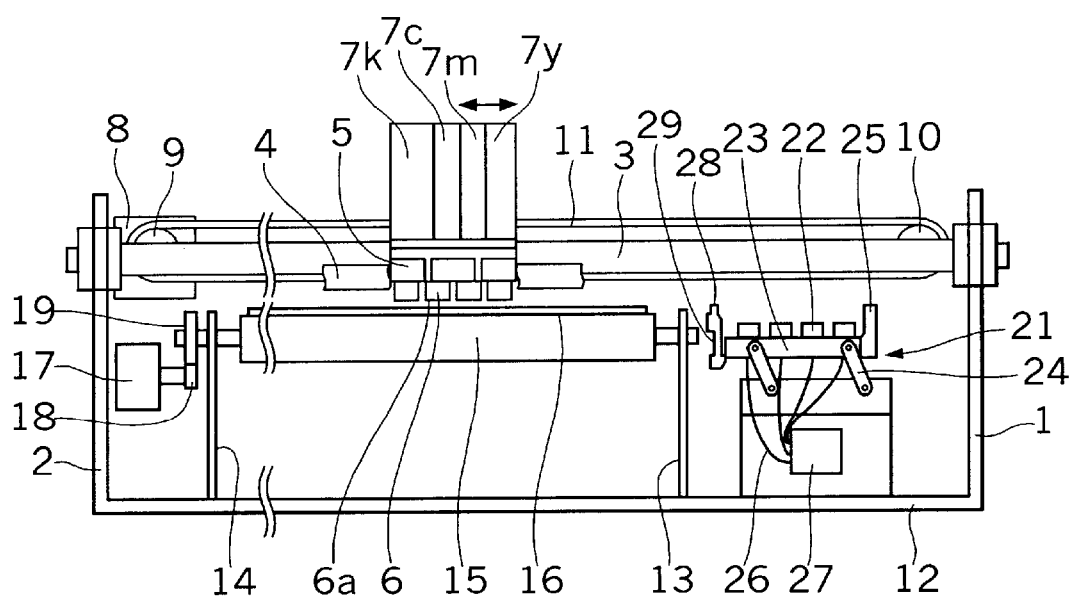
FIG. 1 is a structure of a serial type ink jet recording apparatus provided with an ink cartridge containing a recording liquid according to the present invention.

The above objects of the present invention are accomplished by the following means.

Thus, in accordance with a first aspect, the present invention is directed to an ink for an ink jet recording comprising: (1) a humectant comprising at least one substance selected from a group consisting of glycerin, 1,3-butanediol, triethylene glycol, 1,6-hexanediol, propylene glycol, 1,5-pentanediol, diethylene glycol, dipropylene glycol, trimethylolpropane and trimethylolethane; (2) a colorant; (3) one of polyols having 8 to 11 carbon atoms and glycolether; and (4) one of anionic surfactants and non-ionic surfactants, wherein a contained amount or a density of the colorant is 6% by weight or more based on the total weight of the ink and the ink has a viscosity of 5 mPa·s at 25° C.

Preferably, the ink may comprise a water-soluble organic solvent and water. The contained amount of the colorant in the ink is preferably 8% by weight based on the total weight of the ink and the ink shows a surface tension of 17 to 40 mN/m at 25° C. Also, the viscosity of the ink is preferably 8 to 20 mPa·s (25° C.).

The humectant preferably comprises a glycerin and at least one selected from 1,3-butanediol, triethylene glycol, 1,6-hexanediol, propylene glycol, 1,5-pentanediol, diethylene glycol, dipropylene glycol, trimethylol propane and trimethylolethane.

When using the ink for an ink jet recording according to the present invention, the recording is preferably conducted in the one-pass printing mode under conditions namely a volume of an ink droplet ejected according to one electrical signal is 14 to 43 pl (Pico liter), a velocity of an ink droplet ranging from 6 to 20 m/sec, frequency of 1 kHz and resolution of 300 dpi or more.

In accordance with another aspect, the present invention is directed to an ink for ink jet recording comprising (1) at least one selected from a) self-dispersible organic colorants having at least one hydrophilic group directly bonded to their surfaces and b) self-dispersible organic colorants having at least one hydrophilic group bonded to their surfaces via another group; (2) at least one humectant selected from glycerin, 1,3-butandiol, triethylene glycol, 1,6-hexanediol, propylene glycol, 1,5-pentanediol, diethylene glycol, dipropylene glycol, trimethylolpropane and trimethylolethane; (3) one of a) polyols having at least 8 carbon atoms and b) glycolether; (4) one of anionic surfactants and non-ionic surfactants; and (5) a water-soluble organic solvent and water, wherein the ink has a viscosity of 5 mPa·sec at 25° C.

Also, the ink which is suitably used in a color ink for ink jet recording comprises a self-dispersible organic colorants having at least one hydrophilic group bonded to their surfaces directly or via another atom group, and the ink comprises at least a humectant, a polyol having 8 to 11 carbon atoms or glycol ether, an anionic or non-ionic surfactant, a water-soluble organic solvent and water, in which the humectant comprises at least one selected from glycerin, 1,3-butandiol, triethylene glycol, 1,6-hexanediol, propylene glycol, 1,5-pentanediol, diethylene glycol, dipropylene glycol, trimethylolpropane and trimethylolethane, and the contained amount of the colorant is 6% by weight or more, and preferably 8% by weight or more, the ink shows a surface tension of 17 to 40 mN/m at 25° C. and a viscosity of 5 mPa·s or more, preferably 8 to 20 mPa·s (25° C.).

In accordance with the ink for ink jet recording of the present invention comprises a black ink and at least one color ink, in which the black ink and the color ink comprise: (1) at least one humectant selected from glycerin, 1,3-butandiol triethyleneglycol, 1,6-hexanediol, propyleneglycol, 1,5-pentanediol, diethyleneglycol, dipropyleneglycol, trimethylolpropane and trimethylolethane; (2) a colorant; (3) one of a) polyols having 8 to 11 carbon atoms and b) glycolether; (4) one of a) anionic surfactants and b) non-ionic surfactants; and (5) a water-soluble organic solvent and water, wherein the colorant is contained in an amount of 6% by weight or more based on the total weight of the ink and the ink has a viscosity of 5 mPa·s (5 mPa·sec) at 25° C., and the black ink comprises a self-dispersible colorant as the colorant, and in which the color ink contains a polymer emulsion comprising polymer particles and a water-insoluble or poorly soluble colorant as the colorant.

A method for ink jet recording of the present invention uses the ink of the present invention.

Preferably, the recording is performed in the one-pass printing mode under conditions, namely a volume of an ink droplet ejected in response to 1 electrical signal is in the range of 14 to 43 pl, a velocity of an ink droplet is 6 to 20 m/sec, and frequency of 1 kHz and resolution of 300 dpi or more.

The ink jet recording apparatus of the present invention performs printing according to the above-described method for ink jet recording. Also, the present invention is directed to an ink cartridge for accommodating the ink according to the present invention.

The recorded article of the present invention is obtained by performing printing an article to be printed on a recording medium by the ink jet recording apparatus using the ink.

The first feature of the ink according to the present invention is that a polyol having 8 to 11 carbon atoms or glycol ether and an anionic or non-ionic surfactant are used. Thus, the surface tension of the ink is reduced. The present inventors conducted research and studies with respect to various means in order to improve the fixation of an image. As a result, it has been discovered that by reducing a surface tension of an ink it is possible to rapidly fix an image on an image-receiving medium. The rapid fixation leads to improvement in fixing properties and marker resistance and also promotes supplying of an ink for a head member. Consequently, an ink having a high viscosity of 8 mPa·s (25° C.) or more may have an improved frequency response and remarkably improved ejection stability. The surface tension of the ink is preferably 40 mN/m or less.

The second feature of the ink according to the present invention is that the printing quality is improved by using an ink having a high viscosity of 5 mPa·s or more, and preferably 8 mPa·s or more (25° C.). The ink having a high viscosity of about 8 mPa·s (25° C.) contains about 50% or less of water while the conventional ink having a low viscosity of 3 mPa·s (25° C.) which was used in the ink jet printer in the conventional art contains about 70% of water. Also, the high viscosity ink shows a 2.0 to 3.0 times higher in water evaporation rate when an ink droplet collides against and adheres to a surface of paper. Thus, the colorant at a high concentration can be fixed on a surface of paper at a high speed, thereby reducing the blurring (feathering) phenomenon.

The ink for ink jet recording according to the first embodiment of the present invention is characterized in that the colorant is contained in an amount of 6% by weight or more, preferably 8% or more by weight, based on the total weight of the ink. As the colorant content in the ink increases, the viscosity of the ink also increases, and the colorant can be readily adhered to a surface of paper. As a result, the image density is improved while the feathering is substantially inhibited.

In a preferred embodiment of the present invention, the ink comprises glycerin and at least one humectant having a high viscosity selected from 1,3-butandiol, triethylene glycol, 1,6-hexanediol, propylene glycol, 1,5-pentanediol, diethylene glycol, dipropylene glycol, trimethylolpropane and trimethylolethane. By using such a high viscosity humectant, it is possible to obtain an ink having a higher viscosity as compared to the low viscosity humectant comprising ethylene glycol (diethylene glycol) and glycerol which is conventionally used due to an effect of the colorant having high viscosity.

Now, the present invention will be described in detail.

An ink composition of the present invention shows a viscosity of 5 mPa·s or more, preferably 8 mPa·s or more (25° C.). The ink composition comprises a colorant serving as a colorant, a humectant comprising at least one selected from glycerin, 1,3-butanediol, triethyleneglycol, 1,6-hexanediol, propyleneglycol, 1,5-pentanediol, diethyleneglycol, dipropyleneglycol, trimethylolpropane and trimethylolethane, one of a) polyols having 8 to 11 carbon atoms and b) glycolether, one of a) anionic surfactants and b) non-ionic surfactants and optionally, may further comprise a water-soluble organic solvent and water or an additive as appropriate. Examples of the additive include a surfactant, emulsion, preservative, pH adjusting agent and the like. The humectant is preferably used in a combination of humectant 1 and 2 in order to adjust a viscosity of the humectant and to make effective utilization of characteristics of respective humectants. Now, the respective ingredients of the ink for ink jet recording according to the present invention will be explained.

(1) Colorant

The colorant which can be used in the present invention is not particularly limited but may be an inorganic or organic colorant. The inorganic colorant which can be used includes carbon black prepared by a known method such as a contact method, a furnace method and a thermal method as well as titanium oxide and iron oxide. As the organic colorant, azo colorants (for example, azo lakes, insoluble azo colorants, condensed azo colorants, chelate azo pigment, etc.), polycyclic colorants (for example, phthalocyanine colorants, perylene colorants, perinone colorants, anthraquinone colorants, quinacridon colorants, dioxazine colorants, thioindigo colorants, isoindolenone colorants, quinophthalone colorants, etc.), dye chelate (for example, basic dye chelate, acid dye chelate, etc.), nitro colorants, nitroso colorants, aniline black, and the like can be used.

According to a preferred embodiment of the present invention, among these colorants, the colorant that has an excellent affinity to water is preferably used. The particle diameter of the colorant is preferably in a range of 0.05 $\mu$m to 10 $\mu$m, more preferably 1 $\mu$m or less, most preferably 0.16 $\mu$m or less. The content of the colorant in the ink is preferably in a range of 6 to 20% by weight, more preferably in a range of 8 to 12% by weight based on the total weight of the ink.

Concrete examples of the colorants which can be used in the present invention are as follows:

Black colorant: a class of carbon black (Pigment 7) such as furnace black, lamp black, acetylene black, channel black, etc.; a class of metal such as copper, iron (Pigment 11), titanium oxide, etc; and organic colorants such as Aniline Black (Pigment 1)

Color colorant:

Pigment Yellow 1 (First Yellow G), 3, 12 (Disazo Yellow AAA), 13, 14, 17, 24, 34, 35, 37, 42 (yellow ferric oxide), 53, 55, 81, 83 (Disazo Yellow HR), 95, 97, 98, 100, 101, 104, 408, 109, 110,117, 120, 138, 153

Pigment Orange 5, 13, 16, 17, 36, 43, 51

Pigment Red 1, 2, 3, 5, 17, 22 (Brilliant First Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rod amine 6G Lake), 83, 88, 101 (Red Oxide), 104, 105, 106, 108 (Cadmium Red), 112, 114, 122 (Quinacridon Magenta), 123, 146, 149, 166, 168, 170, 172, 177, 178, 179, 185, 190, 193, 209, 219

Pigment Violet 1(Rhodamine lake), 3, 5:1, 16, 19, 23, 38

Pigment Blue 1, 2, 15 (Phthalocyanine blue R), 15:1, 15:2, 15:3 (Phthalocyanine Blue E), 16, 17:1, 56, 60, 63

Pigment Green 1, 4, 7, 8, 10, 17, 18, 36

Also, a grafted colorant which is prepared by subjecting the colorant (for example, carbon) to a surface treatment with a resin and a treatment so as to make the colorant capable of being dispersed in the water, or a processed colorant which is prepared by adding a functional group such as sulfone group, carboxyl group, etc. to a surface of the colorant (for example, carbon) so as to make the colorant capable of being dispersed in water. In addition, a colorant which is encapsulated in a micro capsule so as to make the colorant capable of being dispersed in water may also be used.

According to a preferred embodiment of the present invention, the colorant for a black ink may be added to the ink as a colorant dispersion prepared by dispersing the colorant in an aqueous medium along with a dispersant. As a preferred dispersant, a known dispersant in preparing a conventionally known color dispersant solution can be used. Examples of the colorant dispersant for use in the present invention are polyacrylic acid, polymethacrylic acid, acrylic acid-acrylonitrile copolymer, vinyl acetate-acrylic acid ester copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, styrene-α-methylstyrene-acrylic acid copolymer-alkyl acrylate copolymer, styrene-maleic acid copolymer, vinylnaphthalene-maleic acid copolymer, vinyl acetate-ethylene copolymer, vinyl acetate-vinyl ethylene ester of aliphatic acid, vinyl acetate-ester of maleic acid copolymer, vinyl acetate-crotonic acid copolymer, vinyl acetate-acrylic acid copolymer and the like. According to a preferred embodiment of the present invention, these copolymers preferably have a weight average molecular weight in a range of 3,000 to 50,000, more preferably in a range of 5,000 to 30,000, and most preferably in a range of 7,000 to 15,000. The added amount of the dispersant is determined within a range which can stably disperse a colorant in water while maintaining other effects of the present invention. The ratio of the dispersant is preferably 1:0.06 to 1:3, more preferably 1:0.125 to 1:3.

The colorant used in the colorant is contained in an amount of 6 to 20% by weight based on the total weight of the ink and has a particle diameter of 0.05 to 0.16 µm. The colorant is dispersed by aid of a dispersant which is a polymer dispersant having a molecular weight of 5,000 to 100,000. Use of a small amount of an aqueous organic solvent such as pyrrolidone derivatives, particularly 2-pyrrolidone may improve the image quality. Next, colorants which can be suitably used in the color ink for ink jet recording will be explained.

According to a preferred embodiment, the colorant for color ink is a self-dispersible color colorant which has at least one hydrophilic group bonded to their surfaces directly or via another group, thereby being capable of producing stable aqueous dispersion without using a dispersant. Thus, it is not needed to employ a dispersant which was used to disperse color colorants in the conventional ink. The preferred self-dispersible color colorant is a colorant capable of being ionized. Suitably, anionized or cationized colorants may be used.

Examples of hydrophilic group which can bind to the surface of the colorant which is anionically charged include —COOM, —SO$_3$M, —PO$_3$HM, —PO$_3$M$_2$, —SO$_2$NH$_2$, —SO$_2$NHCOR and the like, in which M represents a hydrogen atom, alkali metal, ammonium, or organic ammonium and R represents an alkyl group having 1 to 12 carbon atom(s), a phenyl which may be substituted or a naphthyl which may be substituted. Among them, —COOM and —SO$_3$M are preferably used. The alkali metal of M may include, for example, lithium, sodium, potassium and the like and the organic ammonium may include mono- to tri-methylammonium, mono- to tri-ethylammonium, mono- to tri-methanolammonium.

A method for preparing an anionic color colorant, such as by introducing —COONa to the surface of a color colorant, include, for example, a method of treating a color colorant with sodium hypochlorite, a method by sufonation, a method of reacting a color colorant with diazonium salt, but is not limited thereto.

As a hydrophilic group which can bind to the surface of the colorant which is cationically charged, for example quaternary ammonium group is preferably used. More preferably, any one selected from quaternary ammonium group expressed by the following formulae may be used.
—COOM, —SO$_3$M, —SO$_2$NH$_2$,
—PO$_3$HM, —PO$_3$M$_2$, —SO$_2$NHCOR,
—NH$_3^+$, —NR$_3^+$,

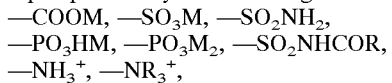
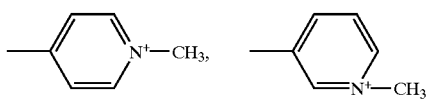

-continued

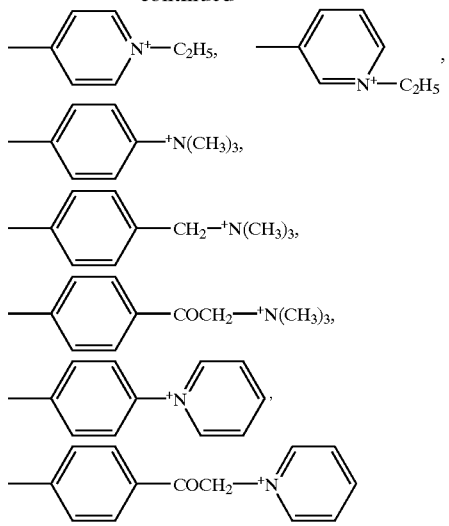

The above-described cationic self-dispersible color colorant having a hydrophilic group bonded may be prepared using a known method in the art. For example, a color colorant is reacted with 3-amino-N-ethylpyridium bromide to bind N-ethylpyridyl group expressed by the following formulae to the colorant.

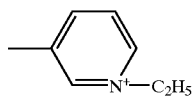

Also, the hydrophilic groups may be bonded to the surface of the colorant via another group. This other group includes for example, alkyl groups having 1 to 12 carbon atom(s), phenyl group which may be substituted, naphthalene group which may be substituted and the like. Specific examples of the hydrophilic group bonded to the surface of the color colorant via another group include —C$_2$H$_4$COOM, —PhSO$_3$M, —C$_5$H$_{10}$NH$_3^+$ and the like, but are not limited thereto.

Thus, the self-dispersible color colorant which can be used in the aqueous colorant ink according to this embodiment is cationically or anionically charged by the hydrophilic group bonded to the surface thereof. As a result, the color colorant can be dispersed in water by ionic repulsion and also has an improved hydrophilicity by the hydrophilic group. Also, in storage for a long period of time, there is no change in the particle diameter and viscosity of the colorant and the colorant can be stably dispersed in the aqueous medium.

Also, the self-dispersible color colorant is not limited one kind of a colorant but can be a mixture of any two or more different colorants to control the color tone. In addition to the self-dispersible colorant, a dye may be further used to control the color tone.

The color colorant include for example, anthraquinone, phthalocyanine blue, phthalocyanine green, diazo, monoazo, pyranthrone, perylene, heterocyclic yellow, quinacridon and (thio)indigo. Representative examples of the phthalocyanine blue include copper phthalocyanine blue and derivatives thereof (Colorant Blue 15), and the like.

Representative examples of the quinacridon include Colorant Orange 48, Colorant Orange 49, Colorant Red 122, Colorant Red 192, Colorant Red 202, Colorant Red 206, Colorant Red 207, Colorant Red 209, Colorant Violet 19, Colorant Violet 42, and the like. Representative examples of the anthraquinone include, Colorant Red 43, Colorant Red 194 (Perinone Red), Colorant Red 216 (Pyranthrone Bromide Red) and Colorant Red 226 (Pyranthrone Red), and the like. Representative examples of the perylene include Colorant Red 123 (vermilion), Colorant Red 149 (Scarlet), Colorant Red 179 (Maroon), Colorant Red 190 (Red), Colorant Violet, Colorant Red 189 (Yellow Shade Red) and Colorant Red 224, and the like. Representative examples of the thioindigo include Colorant Red 86, Colorant Red 87, Colorant Red 88, Colorant Red 181, Colorant Red 198, Colorant Violet 36 and Colorant Violet 38, and the like.

Representative examples of the heterocyclic yellow include Colorant Yellow 117 and Colorant Yellow 138, and the like. Examples of other suitable coloring colorants are presented in, for example, The Colour Index, The third edition, The Society of Dyers and Colorists, 1982.

According to the present invention, the colorant may be used in a polymer emulsion form of polymer particles containing a water-insoluble or poorly soluble colorant. In the emulsion, "containing a colorant" means that the colorant exists either in a state of being enclosed in the polymer particles or being adhered onto the surface of the polymer particles, or exists in both of the foregoing states. However, not all the molecules of the colorant should be enclosed in the polymer particles or adhered onto the surface of the polymer particles. Some of the colorant molecules may be dispersed in the emulsion as long as not damaging the effects of the present invention. The colorant which is water-insoluble or poorly soluble is not particularly limited as long as it can be absorbed onto the surface of the polymer particles. The term "water-insoluble or poorly soluble" as used herein means that the colorant is not dissolved over 10 weight parts based on 100 weight parts of water at 20° C. The term "soluble" as used herein means that when a colorant is dissolved in water no separation or no precipitation of the colorant is observed in the upper level or the bottom level of the aqueous solution with the naked eye. Examples of the colorant include dyes such as oil-soluble dyes, disperse dyes and colorants. Considering capability of being adhered onto or enclosed in the particles, oil-soluble dyes and disperse dyes are preferred. However, in terms of durability of the produced image, colorants are preferred.

When using a colorant in a polymer emulsion comprising polymer particles containing a water-insoluble or poorly soluble colorant, the polymer particles and colorant are preferably dissolved in an organic solvent, for example ketones at a concentration of 2 g/L or more, more preferably at a concentration of 20 to 600 g/L so that the polymer particles are effectively immersed in the solvent. Also, the colorants above-described can be used as the colorant.

In the emulsion, the colorant exists in a state of either being enclosed in the polymer particles or being adhered onto the surface of the polymer particles, or exists in both of the foregoing states. However, not all the molecules of the colorant should be enclosed in the polymer particles nor adhered onto the surface of the polymer particles. Some of the colorant molecules may be dispersed in the emulsion as long as not damaging the effects of the present invention. The colorant which is water-insoluble or poorly soluble is not particularly limited as long as it can be absorbed onto the surface of the polymer particles. The term water-insoluble or poorly soluble as used herein mean that the colorant is not dissolved over 10 weight parts based on 100 weight parts of water at 20. The term soluble as used herein means that when a colorant is dissolved in water no separation or precipitation of the colorant is observed in the upper level or the bottom level of the aqueous solution with the naked eye. Examples of the colorant include dyes such as oil-soluble dyes, disperse dyes and colorants. Considering capability of being adhered onto or enclosed in the particles, oil-soluble dyes and disperse dyes are preferred. However, in terms of durability of the produced image, colorants are preferred. The specific examples of the colorants include those listed above.

As the polymer forming polymer particles, for example, vinyl polymers, polyester polymers and polyurethane polymers can be used. Particularly, vinyl polymers and polyester polymers are preferably used, including polymers disclosed in Japanese Patent Application Laid Open Nos.2000-53897 and 2001-139849.

(2) Humectant and Water-soluble Organic Solvent

The ink according to the present invention includes water as a liquid medium. In order to obtain desired properties of the ink as well as in order to prevent the ink from drying and to improve dissolution stability, the ink includes a humectant or water-soluble organic solvent. The humectant and water-soluble organic solvent may be used as a mixture of two or more thereof.

Specific examples of the humectant and water-soluble organic solvent include: polyols such as ethylene glycol, diethylene glycol, triethylene glycol, propylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petrol and the like; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether and the like; polyol aryl ethers such as ethylene glycol monophenyl ether, ethylene glycol monobenzyl ether and the like; nitrogen-containing heterocyclic compounds such as 2-pyrrolidone, N-methyl-2-pyrrolidone, N-hydroxyethyl-2-pyrrolidone, 1,3-dimethylimidazolidinone, $\epsilon$-caprolactam, $\gamma$-butyrolactone and the like; amides such as formamide, N-methylformamide, N,N-dimethylformamide and the like; amines such as monoethanolamine, diethanolamine, triethanolamine, monoethylamine, diethylamine, triethylamine and the like; sulfur-containing compounds such as dimethyl sulfoxide, sulfolane, thiodiethanol and the like; propylene carbonate, ethylene carbonate, and the like. Among them, diethylene glycol, thiodiethanol, polyethylene glycol 200 to 600, triethylene glycol, glycerol, 1,2,6-hexanetriol, 1,2,4-butanetriol, petrol, 1,5-pentanediol, 2-pyrrolidone, N-methyl-2-pyrrolidone are preferably used. These compounds have a high solubility and can effectively prevent ejecting failure by water evaporation.

Further, preferably, the humectant may further comprises a saccharide. Examples of the saccharides include monosaccharides, disaccharides, oligosaccharides (including trisaccharides and tetrasaccharides) and polysaccharides, preferably glucose, mannose, fructose, ribose, xylose, arabinose, galactose, maltose, cellobiose, lactose, sucrose, trehalose, maltotriose and the like. Here, the polysaccharides refer to saccharides in a broad sense and include $\alpha$-cyclodextrin, cellulose and the like, such as those widely existing in the nature. Also, derivatives of the foregoing saccharides may be used. Examples of the derivatives include reduced sugars, for example, sugar alcohols of the formula $HOCH_2(CHOH)_nCH_2OH$, in which n is an integer of 2 to 5, oxidized sugars, for example, aldonic acids, uronic acids and the like, aminoic acids, thioic acids, and the like. The sugar alcohols are particularly preferred, including for example maltitol and sorbitol and the like. The added amount of the saccharides is suitably in a range of 0.1 to 40% by weight, preferably 0.5 to 30% by weight based on the total weight of the ink.

Ratio of a humectant to a colorant affects the ejection stability of the ink from a print head. When the solid content of a colorant is high and an amount of an added humectant is small, the colorant is dried on a nozzle plate, thereby causing ejecting failure. When a humectant is used in an amount of 10 to 50% by weight, a colorant content is 6% by weight or more, and preferably 8 to 20% by weight. That is, the ratio of a humectant to a colorant is 0.5 to 8.0, preferably 2.0 to 6.0, more preferably 3.0 to 5.0. An ink which satisfies the foregoing range has excellent drying properties, storage stability and reliability.

The surfactants which can be used in the present invention are classified into two types: anionic surfactants and non-ionic surfactants. Examples of anionic surfactants include polyoxyethylenealkyletheracetate, dodecylbenzenesulfonate, laurylate, polyoxyethylenealkylethersulfate, and the like. Examples of non-ionic surfactants include polyoxyethylenealkylether, polyoxyethylenealkylester, polyoxyethylenesorvitane fatty acid ester, polyoxyethylenealkylphenylether, polyoxyethylenealkylamine, polyoxyethylenealkylamide and the like. As the acetylene glycol type surfactants include 2,4,7,9-tetramethyl-5-decyne-4,7-diol, 3,6-dimethyl-4-octyne-3,6-diol, 3,5-dimethyl-1-hexyne-3-ol and the like, for example, safinol 104, 82, 465, 485 or TG, produced by AirProduct & Chemicals (USA) may be used. Safinol 465, 104 or TG is preferred. The foregoing surfactants may be used alone or in a combination of any two or more thereof.

In the present invention, the surface tension is an index expressing the penetration into paper. Particularly, it represents a dynamic surface tension within a short period of one second or less after formation of a surface. Therefore, it is different from a static surface tension measured at a point of time when the surface is saturated. An example of measurement methods is provided in for example, Japanese Patent Application Laid Open No.63-31237. Any method can be used as long as it can measure a dynamic surface tension within one second. In the present invention, the surface tension is measured using a Wilhelmy plate densitometer. Preferably, the surface tension is 40 mN/m$^2$ or less, more preferably 35 mN/m$^2$ or less in order to obtain excellent fixing properties and drying properties.

The polyols having 8 to 11 carbon atoms which can be used in the present invention include for example, diols and triols. Specific examples of the diols are 1,8-octanediol, 2-ethyl-1,3-hexanediol, 3-ethyl-1,3-hexanediol, 1,2,4-trimethyl-1,3-pentanediol, 2,2,4-trimethyl-1,3-petanediol and the like and specific examples of the triols are 1,2,8-octanetriol, 2,3,7-octanetriol and the like.

Particularly, 2-ethyl-1,3-hexanediol and 2,2,4-1,3-pentanediol are preferably used.

In the conventional ink, it was known that such diols, when used with a colorant, may cause agglomeration of the colorant since they are partially soluble in water with a solubility of 0.1 to 4.5% by weight. However, by using the diols along with a surfactant, the agglomeration of a water-insoluble colorant does not occur and works to improve the wetting ability of the colorant to paper as compared to when they are used independently.

Also, it became clear that the reliability of the ink may be increased by regulating the ester contained in the diols as impurity, to a specific range of amounts.

As a preferred embodiment containing an impurity in a diol, 2-ethyl-1,3-hexanediol (EHD) containing a butyric acid ester compound in an amount of 0.05 to 1% by weight can be used. In this case, it is possible to obtain a high quality image having a high stability, high image density under high-speed printing and with less feathering. Butyric acid ester is a by-product produced when synthesizing EHD. In order to lower the content of butyric acid ester to less than 0.05% by weight, additional cost is needed for purification. When the content of butyric acid ester exceeds 2% by weight, the reliability of the ink deteriorates and offensive odor may be caused. In the present invention, EHD containing butyric acid ester is prepared by using aldehyde of a high purity as a raw material. Also, such EHD is commercially available from Kyowa Hakko Kogyo Co., Ltd. under a trade name "Octanediol".

In a preferred embodiment of the ink for ink jet recording according to the present invention, in which EHD containing butyric acid ester in an amount of 0.05 to 1% by weight is added as a penetrating agent, it is possible to improve penetration of the ink to paper and obtain an image with less feathering on interfaces between colors, high image density and less off-setting. The added amount of EHD is preferably in a range of 0.1 to 4%, more preferably in a range of 0.5 to 3% by weight based on the total weight of the ink. When the amount of EHD is less than 0.1% by weight, the effects of EHD is not significant. When the amount of EHD exceeds 4% by weight, the reliability of the ink is deteriorated since its solubility is low.

(3) Emulsion

Preferably, the ink for ink jet recording according to the present invention contains a resin emulsion as an additive. The resin emulsion herein refers to an emulsion that has water as a continuous phase and a resin as a dispersed phase. The resin in the dispersed phase may be an acrylic resin, vinyl acetate resin, styrene-butadiene resin, vinyl chloride resin, acryl-styrene resin, butadiene resin, styrene resin and the like. According to a preferred embodiment of the present invention, the resin is preferably a polymer having a hydrophilic part and a hydrophobic part. The particle diameter of the resin is not particularly limited as long as it can form an emulsion. However, the particle diameter is preferably about 150 nm or less, more preferably 5 to 100 nm. The resin emulsion may be prepared by mixing resin particles with a surfactant in water, where appropriate. For example, an emulsion of an acrylic resin or styrene-acrylic resin may be prepared by mixing (meth)acrylic acid ester or styrene, (meth)acrylic acid ester and optimally, (meth)acrylic acid ester with a surfactant in water. In general, the mixing ratio of a resin to a surfactant is preferably 10:1 to 5:1. When a contained amount of surfactant is out of the foregoing range, forming of a resin emulsion becomes difficult and further, the water resistance of the ink decreases and penetration ability of the ink deteriorates, all of which is unpreferable. The mixing ratio of a resin as a dispersed phase of the emulsion against water is 60 to 400 weight parts of water, preferably 100 to 200 weight parts based on 100 weight parts of a resin.

As a commercially available resin emulsion, there are Micro gel E-1002, E-5002 (a styrene-acrylic resin emulsion, produced by Nippon Paint Co., Ltd.), Boncoat 4001 (an acrylic resin emulsion, produced by Dai Nippon Ink and Chemicals Inc.), Boncoat 5454 (a styrene-acrylic resin emulsion, produced by Dai Nippon Ink and Chemicals Inc.), SAE-1014 (a styrene-acrylic resin emulsion, produced by Zeon Corp.), Saivinol SK-200 (an acrylic resin emulsion, produced by Saiden Chemical Industry Col, Ltd.) and the like. Preferably, the ink according to the present invention contains a resin emulsion such that the resin content becomes 0.1 to 40% by weight, more preferably 1 to 25% by weight based on the total weight of the ink. The resin emulsion has thickening and agglomerating effects and inhibits penetration of colorants. Further, the resin emulsion promotes fixation of the ink onto a recording medium. In addition, certain kinds of resin emulsions can form a coat over the recording medium, thereby improving frictional resistance of the print outs.

(4) Other Additives

In addition to the colorants, solvents, surfactants, the ink according to the present invention may include additives known in the conventional art.

For example, preservatives and anti fungus agents such as sodium dehydroacetate, sodium sorbate, sodium 2-pyridinethiol-1-oxide, sodium benzoic acid, sodium pentachlorophenol and the like may be used in the present invention. As examples of such pH modifying agent, any one that can adjust pH to 7 or higher without affecting the ink composition can be used. For example, amines such as diethanolamine, triethanolamine and the like; alkali metal hydroxides such as lithium hydroxide, sodium hydroxide, potassium hydroxide and the like; ammonium hydroxide, quaternary ammonium hydroxide, quaternary phosphonium hydroxide; carbonates of alkali metals such as lithium carbonate, sodium carbonate, potassium carbonate and the like may be mentioned.

As a chelating agent, for example, ethylenediamine tetrasodium acetate, nitrilo tri-sodium acetate, hydroxyethylethylenediamine tri-sodium acetate, diethylenetriamine pentasodium acetate, uramil di-sodium acetate and the like may be used. As a rust inhibitor, for example, acid sulfite, sodium thiosulfate, ammonium thiodiglycolate, diisopropylammonium nitrite, tetra nitric acid pentaerythritol, dicyclohexylammonium nitrite and the like. According to the purpose, a water-soluble UV absorbing agent, water-soluble infrared absorbing agent, etc. may be added.

As a dispersant for a dispersion, the following compounds may be used.

polyacrylic acid, polymethacrylic acid, acrylic acid-acrylonitrile copolymer, vinyl acetate-acrylic acid ester copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, styrene-α-methylstyrene-acrylic acid copolymer-alkyl acrylate copolymer, styrene-maleic acid copolymer, vinylnaphtalene-maleic acid copolymer, vinyl acetate-ethylene copolymer, vinyl acetate-vinyl ethylene ester of aliphatic acid copolymer, vinyl acetate-ester of maleic acid copolymer, vinyl acetate-crotonic acid copolymer, vinyl acetate-acrylic acid copolymer and the like.

According to a preferred embodiment of the present invention, these copolymers preferably have a weight average molecular weight in a range of 3,000 to 50,000, more preferably in a range of 5,000 to 30,000, and most preferably in a range of 7,000 to 15,000.

The added amount of the dispersant is determined within a range which can stably disperse a colorant in water while maintaining other effects of the present invention. The ratio of the dispersant is preferably 1:0.06 to 1:3, more preferably 1:0.125 to 1:3.

Resin Emulsion

Preferably, the ink for ink jet recording according to the present invention contains a resin emulsion. The resin emulsion refers to an emulsion that has water as a continuous phase and a resin as a dispersed phase. The resin in the dispersed phase may be an acrylic resin, vinyl acetate resin, styrene-butadiene resin, vinyl chloride resin, acryl-styrene resin, butadiene resin, styrene resin and the like.

According to a preferred embodiment of the present invention, the resin is preferably a polymer having a hydrophilic part and a hydrophobic part. The particle diameter of the resin is not particularly limited as long as forming of an emulsion is possible. However, the particle diameter is preferably about 150 nm or less, more preferably 5 to 100 nm.

The resin emulsion may be prepared by mixing resin particles with a surfactant in water, where appropriate. For example, an emulsion of an acrylic resin or styrene-acrylic resin may be prepared by mixing these resins with a surfactant in water.

In general, the mixing ratio of a resin to a surfactant is preferably 10:1 to 5:1. When a contained amount of surfactant is out of the foregoing range, forming of a resin emulsion becomes difficult. Also, the water resistance of the ink decreases and penetration ability of the ink deteriorates, all of which is unpreferable.

The mixing ratio of a resin as a dispersed phase of the emulsion to water is 60 to 400 weight parts of water, preferably 100 to 200 weight parts based on 100 weight parts of a resin.

As a commercially available resin emulsion, there are Micro gel E-1002, E-5002 (a styrene-acrylic resin emulsion, produced by Nippon Paint Co., Ltd.), Boncoat 4001 (an acrylic resin emulsion, produced by Dai Nippon Ink and Chemicals Inc.), Boncoat 5454 (a styrene-acrylic resin emulsion, produced by Dai Nippon Ink and Chemicals Inc.), SAE-1014 (a styrene-acrylic resin emulsion, produced by Zeon Corp.), Saivinol SK-200 (an acrylic resin emulsion, produced by Saiden Chemical Industry Col, Ltd.) and the like.

Preferably, the ink according to the present invention contains a resin emulsion such that the resin content becomes 0.1 to 40% by weight, more preferably 1 to 25% by weight based on the total weight of the ink.

The resin emulsion has thickening and agglomerating effects and inhibits penetration of colorants. Further, the resin emulsion promotes fixation of the ink onto a recording medium. In addition, certain kinds of resin emulsions can form a coat over the recording medium, thereby improving frictional resistance of the print outs.

Now, an ink cartridge receiving a recording liquid and an ink jet recording apparatus provided with the ink cartridge containing the recording liquid will be described referring to the drawings. However, it should be understood that the embodiment is an example for illustration but not for limitation of the present invention. FIG. 1 shows a structure of a serial type ink jet recording apparatus provided with an ink cartridge containing the recording liquid of the present invention. The ink jet recording apparatus includes a main support guide rod 3 and sub-support guide rod 4 laid horizontal between both side panels 1, 2. By these main support and sub-support guide rods 3, and 4, a carriage unit 5 is slidably supported to be able to slide in a main-scanning direction. Over the carriage unit 5, four heads 6, respectively ejecting a yellow (Y) ink, magenta (M) ink, cyan (C) ink, black (Bk) ink, are mounted in such a way that ejection surfaces (nozzle surfaces) 6*a* face downward. Above the heads 6 of the carriage unit 5, four ink cartridges 7*y*, 7*m*, 7*c*, 7*k* for supplying color ink for the four respective heads 6 are exchangeably provided. The carriage unit 5 is connected to a timing belt 11 provided between a driving pulley (driving timing pulley) 9, which is rotated by a main scanning motor 8 and a sub driving pulley (idle pulley) 10. The carriage unit 5, i.e. four heads 6 can move in the main-scanning direction by controlling the main scanning motor 8. On the bottom plate 12 connecting the side panels 1, 2, sub-frames 13, 14 are provided to maintain a returning roller 15 rotatably, whereby paper 16 is carried between the sub-frames 13,14 in a sub-scanning direction orthogonal to the main scanning direction. A sub-scanning motor 17 is disposed at the side of the sub-frame 14. In order to transfer rotation of the sub-scanning motor 17 to the returning roller 15, a gear 18 is provided to be fixed at a rotating axis of the sub-scanning motor 17 and a gear 19 is provided to be fixed at an axis of the returning roller 15. Also, between the side panel 1 and the sub-frame 12, a device 21 for recovering and maintaining the reliabilities of the heads 6 (hereinafter referred to as "sub-system") is provided. The sub-system 21 comprises four cap means 22 for capping the ejection surfaces of the respective heads 6 and holders 23. The holder 23 can be moved by a link member 24. When the carriage unit 5 moves in the main scanning direction to contact with a binding part 25 provided on the holders 23, the holders 23 lifts up, whereby the cap means 22 cap the ejection surfaces 6$a$ of the ink jet heads 6. When the carriage unit 5 moves to a printing region, the holders 23 held down by the movement of the carriage unit 5, allows the cap means 22 to be removed from the ejection surfaces 6$a$ of the ink jet heads 6. The cap means 22 are connected to a sucking pump 27 through sucking tubes 26 and form openings, which are open to outside air through opened tubes via valves. The sucking pump 27 discharges waste liquid to a waste liquid storage tank (now shown) through for example, a drain tube. At the side of the holders 23, a wiper blade 28 as a wiping means is provided to wipe the ejection surfaces 6$a$ of the ink jet heads 6. The blade 28 is formed of a fabric member, foam member or resilient member, such as rubber and is fixed to a blade arm 29. The blade arm 29 is movably supported by a cam which rotates by a driving means not shown in such a manner that it moves by the rotation of the cam.

Figure 2:
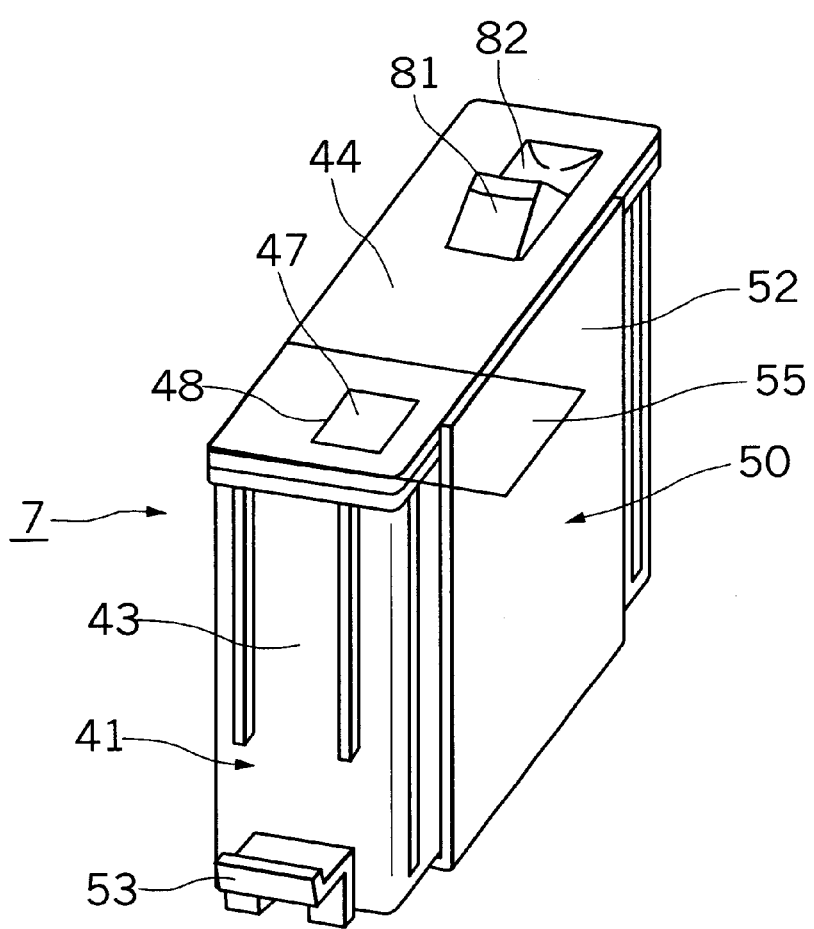
FIG. 2 is a perspective view of the ink cartridge before being loaded on the recording apparatus.
Figure 3:
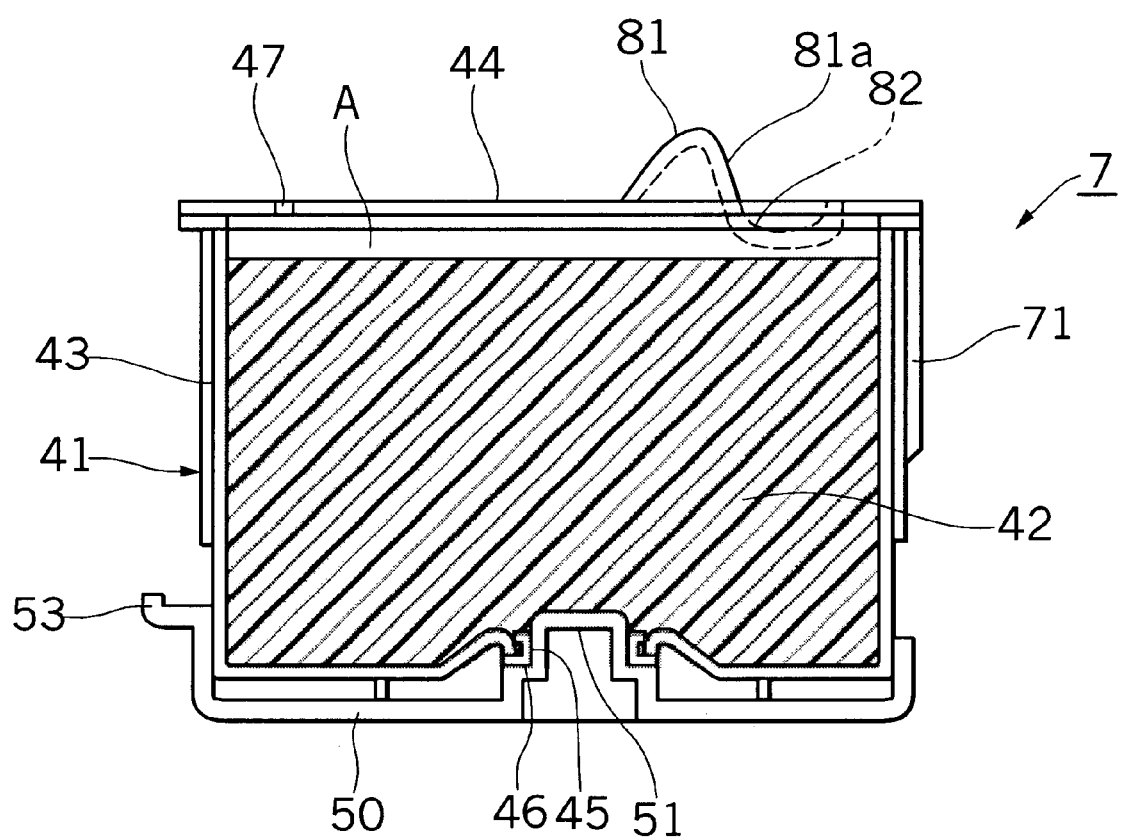
FIG. 3 is a front view of the ink cartridge.

Next, referring to FIG. 2 and FIG. 3, the ink cartridge 7 is explained. FIG. 2 is a perspective view of the ink cartridge before being loaded on the recording apparatus and FIG. 3 is a front view of the ink cartridge. As shown in FIG. 3, the ink cartridge 7 has a main body 41 and an ink absorber 42 (not shown) in which a desired ink is absorbed. The main body 41 is formed of a case 43 having a wide opening at the top and a cover member 44 for covering the opening. The cover member 44 is fixed at the top of the case by adhesion or welding. In general, the main body of the cartridge is formed by molding a resin. The ink absorber 42 is made of a porous body such as urethane foam and press-inserted into the cartridge main body 41, following absorption of an ink. At the bottom of the case 43 of the cartridge 41, an ink supply port 45 is provided to supply the ink to the recording head 6. On the inner circumference of the ink supply port 45, a sealing ring 46 is inserted. On the cover member 44, an opening 47 is formed.

Before loading the cartridge main body 41 is provided with a cap member 50 to close the ink supply port 45 and to prevent the ink contained therein from leaking when the case 43 deforms by a pressure applied on the side panel when loading, transporting, or packaging the cartridge. The opening 47 is sealed by attaching a film-shaped sealing member 55 having an oxygen transmittance of at least 100 ml/m$^2$ on the cover member 44, as shown in FIG. 2. The sealing member 55 has a dimension sufficient for sealing the opening 47 and a plurality of slits 48 formed around the opening 47. By sealing the opening 47 with the sealing member 55 having an oxygen transmittance of at least 100 ml/m$^2$, when the ink cartridge 7 is sealed with an air-impermeable packaging member such as aluminum laminate film, if air existing in the space A (FIG. 3) between the ink absorber 42 and the cartridge main body 41 is dissolved into the ink during ink charging, the air can be exhausted through the sealing member 55 to the space between the cartridge main body 41 and the packaging member where the vacuum is high, improving deaeration.

Figure 4:
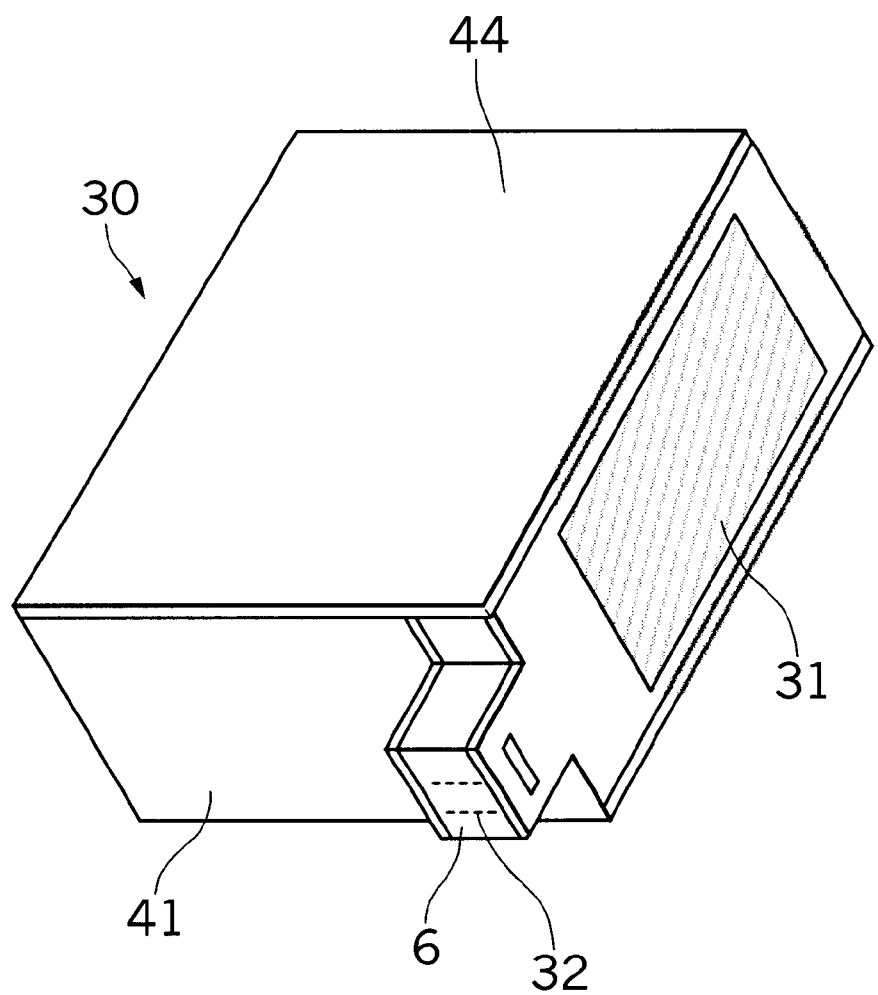
FIG. 4 is a perspective view of a recording unit integrated with a recording head.

FIG. 4 shows a structure of a recording cartridge comprising an recording liquid receiver for containing an ink for ink jet recording according to the present invention and a head for ejecting the ink in a droplet form. The recording unit 30, which is a serial type, have an ink jet head 6, an ink tank 41 for containing a recording liquid to be supplied to the ink jet head 6 and a cover for sealing the ink tank 41. The ink jet head 6 is provided with a plurality of nozzles 32 for ejecting the recording liquid. The recording liquid is transferred from the ink tank 41 through a piping (not shown) to a common liquid chamber (not shown), in which it is ejected from the nozzles 32 according to an electrical signal inputted from the main body of the recording apparatus by an electrode 31. This type of recording unit is suitable for a head which can be produced cheaply, such as those using thermal energy as a driving source, so called thermal type or bubble type. The recording liquid according to the present invention can be effectively used in the bubble type or thermal type recording method, since it has an improved wettability to a heating element by addition of ingredient (A). It can provide ejection stability and frequency stability.

So far, only a serial type ink jet recording apparatus has been described but the recording liquid according to the present invention can be applied to a recording apparatus having a so-called line head, in which nozzles are arranged in a zigzag fashion, integrated to a density equal to or a several portion of the resolution of a desired image and provided in a width of a recording medium. Here, the recording apparatus include a printer for a PC or digital camera and also a multi-functional apparatus combined with facsimile, scanner and telephone.

PREPARATION EXAMPLE

Preparation Example

Now, the present invention will be described in detail by the following preparation examples of the inks for ink jet recording according to the present invention. However, it should be understood that the present invention is not limited thereto.

Surface Treatment of Colorant

As a black colorant, carbon blacks prepared by a furnace method or channel method were used. The primary particles had a particle diameter of 15 nm to 40 nm, a surface area of 50 to 300 m$^2$/g as measured by the BET absorption method, a DBP oil absorption of 40 to 150 ml/100 g and contained volatile matters in an amount of 0.5 to 10%. Though carbon blacks of pH 2 to 9 may be generally used, acid carbon blacks of pH 6 or less are preferred at a high concentration. More preferably, carbon blacks can be subjected to treatment with hypochlorite, a sulfonating agent, a diazonium compound so that an anionic leaving group such as sulfonate, carbonate, etc. is introduced to the surface of the particles. As a yellow colorant, Pigment Yellow 74, 128, 138 which do not have a benzidine structure are preferably used. As a magnet colorant, Pigment Red 122, 209 derived from quinacridon are preferably used. As a cyan colorant, Pigment Blue 15:3 derived from phthalocyanine, aluminium coordinated phthalocyanine, or metal-free phthalocyanine are preferably used. These color colorants can be subjected to the foregoing surface treatment in order to introduce a sulfon group, carbonate group, etc. Such treated colorants can be stably dispersed in the aqueous solvent without need for a dispersant. Also, encapsulated or grafted colorants which are excellent in the dispersion stability and reliability can be used.

Preparation Example 1

Carbon Black Dispersion 1 Treated with Hypochlorite 300 g of commercially available acid carbon black (pH 2.5), supplied by Cabot under a trade name of Monarch 1300, was mixed with 1000 ml of water and 450 g of hypochlorite (effective chlorine concentration: 12%) was added dropwise thereto and heated to 100 to 105° C. for 8 hours while stirring.

To the resulting solution, 100 g of hypochlorite (effective chlorine concentration 12%) was added and dispersed for 3 hours using a horizontal homogenizer. The slurry was diluted 10 times with water. After treated with lithium hydroxide to adjust pH, the solution was concentrated and desalted using a ultrafiltration membrane to a conductivity of 0.2 mS/cm to form a carbon black dispersion with a colorant concentration of 15%. The dispersion was centrifuged to remove coarse particles and then, filtered by a nylon filter of 1 micron to obtain a carbon black dispersion 1. The average particle diameter (D50%) was found to be 95 nm, as measured by a Microtrack UPA.

Preparation Example 2

Carbon Black Dispersion 2 Treated with Sulfonating Agent 150 g of commercially available carbon black colorant, supplied by Degussa under a trade name of Printex#85, was mixed with 400 ml of sulfolane. The mixture was ground using a bead mill and stirred with 15 g of sulfonamide at 140 to 150° C. for 10 hours. The resulting slurry was added to 1000 ml of ion exchange water and centrifuged at 12000 rpm to obtain a surface-treated carbon black as a wet cake. The carbon black wet cake was redispersed in 2000 ml of ion exchange water and treated with lithium hydroxide to adjust pH. The solution was concentrated and desalted by a ultrafiltration membrane to form a carbon black dispersion with a colorant concentration of 10% by weight. The dispersion was filtered by a nylon filter of 1 micron to obtain a carbon black dispersion 2. The average particle diameter (D50%) was found to be 80 nm.

Preparation Example 3

Carbon Black Dispersion 3 Treated with Diazo Compound 100 g of carbon black having a surface area of 230 $m^2/g$ and DBP oil absorption of 70 ml/100 g and 34 g of p-amino-N-benzoic acid were dispersed in 750 g of water. 16 g of nitric acid was added dropwise to the dispersion and stirred at 70° C. After 5 minutes, a solution of 11 g of sodium nitrite dissolved in 50 g of water was added to the dispersion and stirred for 1 hour. The resulting slurry was diluted 10 times and centrifuged to remove coarse particles. The solution was treated with diethanolamine to set pH to 8 to 9. The solution was concentrated and desalted by a ultrafiltration membrane to form a carbon black dispersion with a colorant concentration of 15%. The dispersion was filtered by a polypropylene filter of 0.5 μm to obtain a carbon black dispersion 3. The average particle diameter was found to be 99 nm.

Preparation Example 4

Carbon Black Dispersion 4 Treated with Diazo Compound

A solution of 43 g of sulfonyl acid in 42 L of water at 75° C. was added to 202 g of carbon black having a surface area of 230 $m^2/g$ and DBP oil absorption of 70 ml/100 g while stirring. The mixture was cooled to room temperature while stirring, followed by adding 26.2 g of concentrated nitric acid and a solution of 20.5 of sodium nitrite in water. An intrasalt of 4-sulfobenzenediazonium hydroxide was prepared, which was reacted with the carbon black. The reaction was stirred until generation of bubbles stopped. The resulting slurry was diluted and treated with lithium to set pH 8 to 9. The solution was centrifuged to remove coarse particles and then concentrated and desalted by a ultrafiltration membrane to form a carbon black dispersion with a colorant concentration of 15%. The dispersion was filtered by a polypropylene filter of 1 μm to obtain a carbon black dispersion 4. The average particle diameter (D50%) was found to be 95 nm.

Preparation Example 5

Chemically Surface-Treated Color Colorant Dispersion (Yellow Dispersion 1, Magenta Dispersion 1, Cyan Dispersion 1)

As a yellow colorant, Pigment yellow 128 was subjected to low temperature plasma treatment to produce a colorant with carbonic acid introduced. The colorant was dispersed in ion exchange water, which was then concentrated and desalted by a ultrafiltration membrane to form a yellow colorant dispersion 1 with a colorant concentration of 15%. The average particle diameter (D50%) was found to be 70 nm. Similarly, using Pigment magenta 122 as a magenta colorant, a magenta colorant dispersion 1 with a colorant concentration of 15%. The average particle diameter (D50%) was found to be 60 nm. Similarly, using Pigment cyan 15:3 as a cyan colorant, a cyan colorant dispersion 1 with a colorant concentration of 15%. The average particle diameter (D50%) was found to be 80 nm.

Preparation Example 6

Preparation of Self-Dispersible Phthalocyanine Colorant (Cyan)

20 g of phthalocyanine blue (colorant blue 15:3) was mixed with 4.0 g of sulfonyl acid. The mixture was put into a beaker in a water bath at 70° C. A solution of 1.68 g of sodium nitrite dissolved in 74.32 g of distilled water was rapidly added to the beaker while stirring to obtain a slurry. Hydrochloric acid was added to set pH to 2. The slurry was mixed at a high speed using a magnetic stirrer for 1 hour at 70° C., followed by drying in a furnace at 70° C. Thus, a modified coloring colorant containing $C_6H_4SO_3$—$NA^+$ group was obtained.

6 g of the surface-modified coloring colorant was extracted with methanol on Soxlet extractor for 10 hours and all the by-products were removed, followed by redrying. The surface-modified coloring colorant was readily dissolved in an aqueous medium by stirring.

Preparation Example 7

Preparation of Self-Dispersible Quinacridon Colorant (Magenta)

A surface-modified quinacridon colorant was prepared following the procedure of Preparation Example 6, except that hostaperm pink E colorant (colorant red 122) was used instead of phthalocyanine blue. As in Preparation Example 6, the resulting surface-modified coloring colorant was readily dissolved in an aqueous medium by stirring.

Preparation Example 8

Preparation of Self-dispersible Yellow Colorant

A surface-modified yellow colorant was prepared following the procedure of Preparation Example 6, except that colorant yellow 74 was used instead of phthalocyanine blue. As in Preparation Example 6, the resulting surface-modified coloring colorant was readily dissolved in an aqueous medium by stirring.

Preparation Example 9

Preparation of Self-dispersible Yellow Colorant (Cationic)

A surface-modified yellow colorant was prepared following the procedure of Preparation Example 6, except that colorant yellow 74 was used instead of phthalocyanine blue and N-(4-aminophenyl)pyridium chloride was used instead of sulfonyl acid. As in Preparation Example 6, the resulting surface-modified coloring colorant was readily dissolved in an aqueous medium by stirring.

In the present invention, a surfactant may be used to improve wettability to a recording paper. Preferred surfactants include polyoxyethylenealkylether acetate, dialkylsulfosuccinate, polyoxyethylenealkylether, polyoxyethylenealkylphenylether, polyoxyethylenepolyoxypropylene block copolymers and acetylene glycol. More particularly, an anionic surfactant such as polyoxyethylenealkylether acetate (I) and/or dialkylsulfosuccinic acid (II) containing a straight or branched alkyl group having 5 to 7 carbon atoms may be used to improve properties of plain paper. Furthermore, when coloring agent dissolved, dispersion stability improved.

$$R1-O-(CH_2CH_2O)_mCH_2COOM \quad (I)$$

in which R1 is a straight or branched alkyl group having 6 to 14 carbon atoms, m is 3 to 12, and M is alkali metal ion, tert-ammonium, tert-phosphonium, or alkanolamine.

in which $R_2$ is a straight or branched alkyl group having 5 to 16 carbon atoms, and M is alkali metal ion, tert-ammonium, tert-phosphonium, or alkanolamine.

Also, as a ion-pair of the surfactant, lithium ion and tert-ammonium and tert-phosphonium expressed by the following formula may be used to improve the dissolution stability of the surfactant. Preferred non-ionic surfactants may include polyoxyethylenealkylphenylether of the following formula (III) and acetylene glycol type surfactants of the following formula (IV). Combined use of these surfactants allows the permeation properties to synergically increase. Thus, blotting on a boundary between colors is inhibited and also it is possible to print clear characters.

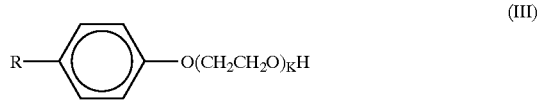

in which R is a straight or branched hydrocarbon having 6 to 14 carbon atoms and k is 5 to 20.

$$R-(OCH_2CH_2)_nOH \quad (IV)$$

in which R is a straight or branched hydrocarbon having 6 to 14 carbon atoms and n is 5 to 20.

Also, a compound expressed by the following formulae (V) or (VI) may be used.

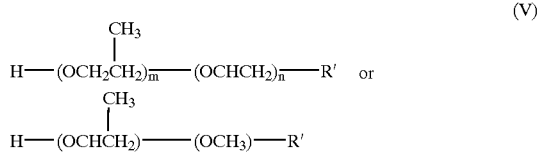

in which R' is a straight or branched hydrocarbon having 6 to 14 carbon atoms and m and n are independently up to 20.

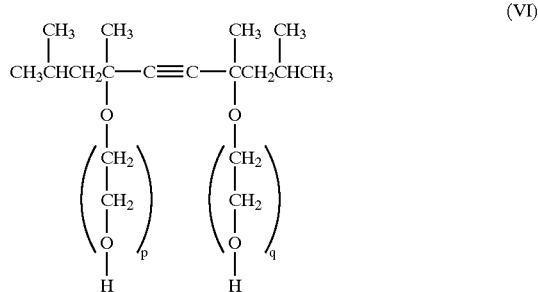

in which p and q are independently up to 40.

According to the present invention, it is provided a recording method on the above-described plain paper using the ink to form image of a high quality and resolution. However, over pH 9, the surfactant of the formula (II) tends to be decomposed during storage, causing change in the properties. Therefore, when using the surfactant of the formula (II), pH is preferably adjusted to in a range of 6 to 9. Also, over pH 6, it is possible to maintain storage stability of the ink. In general, the reproduction paper and the like which are used in the office have pH of 5 to 6. Thus, it is provided a recording method on this paper by ejecting the ink in droplets having a weight in a range of 3 ng to 50 ng at a velocity of 5 to 20 m/s from a fine nozzle having a diameter of 9 to 60 μm, in which the paper has a stockigt sizing degree of 3 seconds, as measured according to the JISP-8122 test method with an ink adhesion amount of 1.5 g/m² to 30 g/m². However, over pH 9, the surfactant of the formula (II) tends to be decomposed during storage, causing change in properties. Therefore, when using the surfactant of the formula (II), pH is preferably adjusted to in a range of 6 to 9.

The added amount of the compound of the formulae (I), (II), (III), (IV), (V), or (VI) which can be used in the present invention is 0.05 to 10% by weight, so as to sufficiently provide the permeation required by a printer system. When the amount is equal to or less than 0.05% by weight, blotting may occur on a boundary of two colors. When the amount is equal to or over 10% by weight, the compound may be crystallized at a low temperature, thereby lacks reliability.

The surfactants expressed by the formulae (I) and (II) which can be used in the present invention are shown in their free acid forms as follows:

$$CH_3(CH_2)_{12}O(CH_2CH_2O)_3CH_2COOH \qquad (I\text{-}1)$$

$$CH_3(CH_2)_{12}O(CH_2CH_2O)_4CH_2COOH \qquad (I\text{-}2)$$

$$CH_3(CH_2)_{12}O(CH_2CH_2O)_5CH_2COOH \qquad (I\text{-}3)$$

$$CH_3(CH_2)_{12}O(CH_2CH_2O)_6CH_2COOH \qquad (I\text{-}4)$$

(I-5)

(I-6)

(II-1)

(II-2)

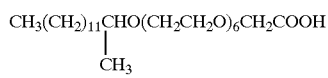
(II-3)

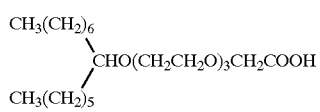
(II-4)

EXAMPLE

Now, the present invention is described using the following examples and comparative examples. However, the present invention is not limited thereto. The amounts (%) of ingredients described in the examples are based on the weight.

Example 1

Ingredients as described below was mixed together and treated with 10% aqueous solution of lithium hydroxide to adjust its pH to 9. The thus obtained mixture was filtered through a membrane filter with an average pore size of 0.8 μm to obtain an ink composition.

| | |
|---|---|
| Carbon black dispersion | 8.0% (carbon black solid concentration) |
| Triethylene glycol | 22.5% |
| Glycerol | 7.5% |
| 2-pyrrolidone | 5.0% |
| Surfactant (I-1) | 2.0% |
| 2-ethyl-1,3-hexanediol | 2.0% |
| Emulsion | 3.0% |
| PROXEL LV (preservative) | 0.2% |
| Ion-exchange water | Balance |

Example 2

An ink composition was prepared following the procedure in Example 1 except for using the following composition. The pH of the mixture was adjusted to 9 by the addition of sodium hydroxide.

| | |
|---|---|
| Carbon black dispersion | 10.0% (carbon black solid concentration) |
| Propylene glycol | 30.0% |
| Glycerol | 10.0% |
| N-methyl-2-pyrrolidone | 2.0% |
| Surfactant (I-2) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 3

An ink composition was prepared following the procedure in Example 1 except for using the following composition. The pH of the mixture was adjusted to 9 by the addition of sodium hydroxide.

| | |
|---|---|
| Carbon black dispersion | 12.0% (carbon black solid concentration) |
| Dipropylene glycol | 20.0% |
| Glycerol | 10.0% |
| N-hydroxyethyl-2-pyrrolidone | 5.0% |
| Surfactant (I-3) | 2.0% |
| 2-ethyl-1,3-hexanediol | 2.0% |
| Emulsion | 3.0% |
| PROXEL LV (preservative) | 0.2% |
| Ion-exchange water | Balance |

Example 4

An ink composition was prepared following the procedure in Example 1 except for using the following composition. The pH of the mixture was adjusted to 9 by the addition of lithium hydroxide.

| | |
|---|---|
| Carbon black dispersion | 10.0% (carbon black solid concentration) |
| 1,3-butanediol | 22.5% |
| Glycerol | 7.5% |

-continued

| | |
|---|---|
| 2-pyrrolidone | 5.0% |
| Surfactant (I-4) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 5

An ink composition was prepared following the procedure in Example 1 except for using the following composition. The pH of the mixture was adjusted to 9 by the addition of lithium hydroxide.

| | |
|---|---|
| Emulsion-coated carbon black dispersion (Kao Corporation) | 9.0% (carbon black solid concentration) |
| 2,3-butanediol | 22.5% |
| Glycerol | 7.5% |
| N-methyl-2-pyrrolidone | 3.0% |
| Surfactant (I-5) | 2.0% |
| 2-ethyl-1,3-hexanediol | 2.0% |
| PROXEL LV (preservative) | 0.2% |
| Ion-exchange water | Balance |

Example 6

An ink composition was prepared following the procedure in Example 1 except for using the following composition. The pH of the mixture was adjusted to 9 by the addition of lithium hydroxide.

| | |
|---|---|
| Self-dispersible carbon black dispersion (Toyo Ink MFG. Co., Ltd.) | 10.0% (carbon black solid concentration) |
| Dipropylene glycol | 15.0% |
| Glycerol | 15.0% |
| N-hydroxyethyl-2-pyrrolidone | 5.0% |
| Surfactant (I-6) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 7

An ink composition was prepared following the procedure in Example 1 except for using the following composition. The pH of the mixture was adjusted to 9 by the addition of lithium hydroxide.

| | |
|---|---|
| Carboxy group-added carbon black dispersion (Cabot Speciality Chemicals Inc. CSCI) | 13.0% (carbon black solid concentration) |
| 1,3-propanediol | 22.5% |
| Glycerol | 7.5% |
| 2-pyrrolidone | 5.0% |
| Surfactant (II-1) | 2.0% |
| 2-ethyl-1,3-hexanediol | 2.0% |
| Emulsion | 3.0% |

-continued

| | |
|---|---|
| PROXEL LV (preservative) | 0.2% |
| Ion-exchange water | Balance |

Example 8

An ink composition was prepared following the procedure in Example 1 except for using the following composition. The pH of the mixture was adjusted to 9 by the addition of lithium hydroxide.

| | |
|---|---|
| Sulfone group-added carbon black dispersion (Cabot Speciality Chemicals Inc. CSCI) | 14.0% (carbon black solid concentration) |
| 1,4-butanediol | 22.5% |
| Glycerol | 7.5% |
| N-methyl-2-pyrrolidone | 2.0% |
| Surfactant (II-2) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 9

An ink composition was prepared following the procedure in Example 1 except for using the following composition. The pH of the mixture was adjusted to 9 by the addition of lithium hydroxide.

| | |
|---|---|
| Carboxy group-added carbon black dispersion (Orient Chemical Industries, Ltd.) | 10.0% (carbon black solid concentration) |
| 1,5-pentanediol | 15.0% |
| Glycerol | 15.0% |
| N-hydroxyethyl-2-pyrrolidone | 2.0% |
| Surfactant (II-3) | 2.0% |
| 2-ethyl-1,3-hexanediol | 2.0% |
| Emulsion | 3.0% |
| PROXEL LV (preservative) | 0.2% |
| Ion-exchange water | Balance |

Example 10

An ink composition was prepared following the procedure in Example 1 except for using the following composition. The pH of the mixture was adjusted to 9 by the addition of lithium hydroxide.

| | |
|---|---|
| Microcapsule-containing carbon black dispersion (Dai Nippon Ink & Chemicals Inc.) | 11.0% (carbon black solid concentration) |
| 1,6-hexanediol | 22.5% |
| Glycerol | 7.5% |
| 2-pyrrolidone | 3.0% |
| Surfactant (II-4) | 2.0% |
| 2,2,4-trimethyl-1,3-pentanediol | 2.0% |
| PROXEL LV (preservative) | 0.2% |
| Ion-exchange water | Balance |

Example 11

An ink composition was prepared following the procedure in Example 1 except for using the following composition. The pH of the mixture was adjusted to 9 by the addition of sodium hydroxide.

| | |
|---|---|
| Polymeric dispersant-dispersed carbon black dispersion Dainichiseika Color & Chemical Mfg. Co., Ltd.) | 8.0% (carbon black solid concentration) |
| 2-methyl-2,4-pentanediol | 22.5% |
| Glycerol | 7.5% |
| N-methyl-2-pyrrolidone | 5.0% |
| Surfactant (III, in which R = C6, k = 5) | 2.0% |
| 2-ethyl-1,3-hexanediol | 2.0% |
| PROXEL LV (preservative) | 0.2% |
| Ion-exchange water | Balance |

Example 12

An ink composition was prepared following the procedure in Example 1 except for using the following composition. The pH of the mixture was adjusted to 9 by the addition of sodium hydroxide.

| | |
|---|---|
| Surfactant-dispersed carbon black dispersion (Fuji Colorant Co., Ltd.) | 8.0% (carbon black solid concentration) |
| 1,2,6-hexanetriol | 30.0% |
| Glycerol | 10.0% |
| N-hydroxyethyl-2-pyrrolidone | 5.0% |
| Surfactant (IV, in which R = C6, n = 5) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 13

An ink composition was prepared following the procedure in Example 1 except for using the following composition. The pH of the mixture was adjusted to 9 by the addition of sodium hydroxide.

| | |
|---|---|
| Carboxyl-added self-dispersible carbon black dispersion (Taisei Kako Corp.) | 10.0% (carbon black solid concentration) |
| Trimethylolpropane | 2.0% |
| Glycerol | 20.0% |
| 2-pyrrolidone | 4.0% |
| Surfactant (V, in which R = C6, n = 2, M = 3) | 2.0% |
| 2-ethyl-1,3-hexanediol | 2.0% |
| Emulsion | 3.0% |
| PROXEL LV (preservative) | 0.2% |
| Ion-exchange water | Balance |

Example 14

An ink composition was prepared following the procedure in Example 1 except for using the following composition. The pH of the mixture was adjusted to 9 by the addition of lithium hydroxide.

| | |
|---|---|
| Polymeric dispersant-dispersed carbon black dispersion (Mikuni Color Ltd.) | 8.0% (carbon black solid concentration) |
| Trimethylolethane | 22.5% |
| Glycerol | 7.5% |
| Surfactant (VI), a mixture of a compound (p + q = 15) and a compound (p + q = 0) | 2.0% |
| 2,2,4-trimethyl-1,3-pentanediol | 2.0% |
| PROXEL LV (preservative) | 0.2% |
| Ion-exchange water | Balance |
| Cyan colorant ink | |

An ink composition was prepared following the procedure in Example 1 except for using the following composition. The pH of the mixture was adjusted to 9 by the addition of lithium hydroxide.

| | |
|---|---|
| Cyan dispersion | 16.0% (cyan colorant solid concentration) |
| Urea | 22.5% |
| Glycerol | 7.5% |
| N-hydroxylethyl-2-pyrrolidone | 5.0% |
| ECTD-3NEX (anionic surfactant, Nikko Chemicals Col, Ltd.) | 2.0% |
| 2-ethyl-1,3-hexanediol | 2.0% |
| Emulsion | 3.0% |
| PROXEL LV (preservative) | 0.2% |
| Ion-exchange water | Balance |
| Magenta colorant ink | |

An ink composition was prepared following the procedure in Example 1 except for using the following composition. The pH of the mixture was adjusted to 9 by the addition of lithium hydroxide.

| | |
|---|---|
| Magenta dispersion | 16.0% (Magenta colorant solid concentration) |
| 1,3-dimethylimidazolidinone | 15.0% |
| Glycerol | 15.0% |
| 2-pyrrolidone | 5.0% |
| ECTD-6NEX (anionic surfactant, Nikko Chemicals Col, Ltd.) | 2.0% |
| 2,2,4-trimethyl-1,3-pentanediol | 2.0% |
| Emulsion | 3.0% |
| PROXEL LV (preservative) | 0.2% |
| Ion-exchange water | Balance |
| Yellow colorant ink | |

An ink composition was prepared following the procedure in Example 1 except for using the following composition. The pH of the mixture was adjusted to 9 by the addition of sodium hydroxide.

| | |
|---|---|
| Yellow dispersion | 16.0% (Yellow colorant solid concentration) |
| maltitose | 25.0% |
| Glycerol | 15.0% |
| N-methyl-2-pyrrolidone | 5.0% |
| Disphenol TOC (non-ionic surfactant, NOF Corporation) | 2.0% |
| 2-ethyl-1,3-hexanediol | 2.0% |
| PROXEL LV (preservative) | 0.2% |

-continued

| Ion-exchange water | Balance |

Comparative Example 1

Ingredients as described below were mixed together and treated with 10% aqueous solution of lithium hydroxide to adjust its pH to 9. The thus obtained mixture was filtered through a membrane filter with an average pore size of 0.8 μm to obtain an ink composition.

| | |
|---|---|
| Carboxyl group-added carbon black dispersion (Cabot Speciality Chemicals Inc. CSCI) | 5.0% (carbon black solid concentration) |
| Ethylene glycol | 15.0% |
| Glycerol | 5.0% |
| 2-pyrrolidone | 2.0% |
| ECTD-3NEX (anionic surfactant, Nikko Chemicals Co., Ltd.) | 1.0% |
| 2-theyl-1,3-hexanediol | 2.0% |
| Emulsion | 3.0% |
| PROXEL LV (preservative) | 0.2% |
| Ion-exchange water | Balance |

Comparative Example 2

An ink composition was prepared following the procedure in Example 1 except for using the following composition. The pH of the mixture was adjusted to 9 by the addition of lithium hydroxide.

| | |
|---|---|
| Polymeric dispersant-dispersed carbon black dispersion (Dainichiseika Color & Chemicals Mfg. Co., Ltd.) | 5.0% (carbon black solid concentration) |
| Diethylene glycol | 15.0% |
| Glycerol | 5.0% |
| N-methyl-2-pyrrolidone | 2.0% |
| ECTD-3NEX (anionic surfactant, Nikko Chemicals Co., Ltd.) | 1.0% |
| 2,2,4-trimethyl-1,3-pentanediol | 2.0% |
| PROXEL LV (preservative) | 0.2% |
| Ion-exchange water | Balance |

Comparative Example 3

An ink composition was prepared following the procedure in Example 1 except for using the following composition. The pH of the mixture was adjusted to 9 by the addition of lithium hydroxide.

| | |
|---|---|
| Surfactant-dispersed carbon black dispersion (Fuji Colorant Co., Ltd.) | 5.0% (carbon black solid concentration) |
| Triethylene glycol | 15.0% |
| Glycerol | 5.0% |
| N-hydroxyethyl-2-pyrrolidone | 2.0% |
| Disphenol TOC (non-ionic surfactant, NOF Corporation) | 1.0% |
| Emulsion | 3.0% |
| PROXEL LV (preservative) | 0.2% |
| Ion-exchange water | Balance |

Comparative Example 4

An ink composition was prepared following the procedure in Example 1 except for using the following composition. The pH of the mixture was adjusted to 9 by the addition of sodium hydroxide.

| | |
|---|---|
| Polymeric dispersant-dispersed carbon black dispersion | 5.0% (carbon black solid concentration) |
| ethylene glycol | 15.0% |
| Glycerol | 5.0% |
| 2-pyrrolidone | 2.0% |
| ECTD-6NEX (anionic surfactant, Nikko Chemicals Col, Ltd.) | 1.0% |
| 2,2,4-trimethyl-1,3-pentanediol | 2.0% |
| PROXEL LV (preservative) | 0.2% |
| Ion-exchange water | Balance |

Comparative Example 5

An ink composition was prepared following the procedure in Example 1 except for using the following composition. The pH of the mixture was adjusted to 9 by the addition of lithium hydroxide.

| | |
|---|---|
| Self-dispersible carbon black dispersion (Taisei Kako Corp.) | 5.0% (carbon black solid concentration) |
| Diethylene glycol | 15.0% |
| Glycerol | 5.0% |
| N-methyl-2-pyrrolidone | 2.0% |
| ECTD-6NEX (anionic surfactant, Nikko Chemicals Col, Ltd.) | 1.0% |
| 2,2,4-trimethyl-1,3-pentanediol | 2.0% |
| Emulsion | 3.0% |
| PROXEL LV (preservative) | 0.2% |
| Ion-exchange water | Balance |

Concentrations of colorants and humectants of ink compositions prepared in Examples 1 to 14, cyan, magenta and yellow colorant ink compositions, and ink compositions prepared in Comparative Examples 1 to 5 are shown in Table 1 below.

TABLE 1

| | Pigment solid content (% by weight) | Humectant content (% by weight) | Viscosity (mPa · s, at 25° C.) |
|---|---|---|---|
| Example 1 | 8.0 | 30.0 | 8.24 |
| Example 2 | 10.0 | 40.0 | 10.13 |
| Example 3 | 12.0 | 30.0 | 9.53 |
| Example 4 | 10.0 | 30.0 | 8.11 |
| Example 5 | 9.0 | 30.0 | 8.87 |
| Example 6 | 10.0 | 30.0 | 8.10 |
| Example 7 | 13.0 | 30.0 | 9.61 |
| Example 8 | 14.0 | 30.0 | 9.66 |
| Example 9 | 10.0 | 30.0 | 8.37 |
| Example 10 | 11.0 | 30.0 | 8.05 |
| Example 11 | 8.0 | 30.0 | 11.56 |
| Example 12 | 8.0 | 40.0 | 9.34 |
| Example 13 | 10.0 | 40.0 | 9.11 |
| Example 14 | 8.0 | 30.0 | 8.68 |
| Cyan colorant ink | 6.0 | 30.0 | 8.39 |
| Magenta colorant ink | 6.0 | 30.0 | 9.01 |
| Yellow colorant ink | 6.0 | 40.0 | 9.25 |
| Comp. Example 1 | 5.0 | 20.0 | 2.84 |
| Comp. Example 2 | 5.0 | 20.0 | 2.65 |

TABLE 1-continued

|  | Pigment solid content (% by weight) | Humectant content (% by weight) | Viscosity (mPa · s, at 25° C.) |
|---|---|---|---|
| Comp. Example 3 | 5.0 | 20.0 | 3.05 |
| Comp. Example 4 | 5.0 | 20.0 | 3.54 |
| Comp. Example 5 | 5.0 | 20.0 | 4.31 |

Example 15

Ingredients as described below was mixed together and treated with 10% aqueous solution of lithium hydroxide to adjust its pH to the range of 9. The thus obtained mixture was filtered through a membrane filter with an average pore size of 0.8 μm to obtain an ink composition.

| Self-dispersible phthalocyanine colorant | 8.0% |
|---|---|
| Triethylene glycol | 22.5% |
| Glycerol | 7.5% |
| 2-pyrrolidone | 5.0% |
| Surfactant (I-1) | 2.0% |
| 2-ethyl-1,3-hexanediol | 2.0% |
| Emulsion | 3.0% |
| PROXEL LV (preservative) | 0.2% |
| Ion-exchange water | Balance |

Example 16

An ink composition was prepared following the procedure in Example 15 except for using the following composition. The pH of the mixture was adjusted to 9 by the addition of sodium hydroxide.

| Self-dispersible quinacridon colorant | 10.0% |
|---|---|
| Propylene glycol | 30.0% |
| Glycerol | 10.0% |
| N-methyl-2-pyrrolidone | 2.0% |
| Surfactant (I-2) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 17

An ink composition was prepared following the procedure in Example 15 except for using the following composition. The pH of the mixture was adjusted to 9 by the addition of lithium hydroxide.

| Self-dispersible yellow colorant (PY74) | 10.0% |
|---|---|
| 1,3-butanediol | 22.5% |
| Glycerol | 7.5% |
| 2-pyrrolidone | 5.0% |
| Surfactant (I-4) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 18

An ink composition was prepared following the procedure in Example 15 except for using the following composition. The pH of the mixture was adjusted to 9 by the addition of lithium hydroxide.

| Self-dispersible cyan colorant | 9.0% |
|---|---|
| 2,3-butanediol | 22.5% |
| Glycerol | 7.5% |
| N-methyl-2-pyrrolidone | 3.0% |
| Surfactant (I-5) | 2.0% |
| 2,3-ethyl-1,3-hexanediol | 2.0% |
| PROXEL LV (preservative) | 0.2% |
| Ion-exchange water | Balance |

Example 19

An ink composition was prepared following the procedure in Example 15 except for using the following composition. The pH of the mixture was adjusted to 9 by the addition of lithium hydroxide.

| Self-dispersible quinacridon colorant | 10.0% |
|---|---|
| Dipropylene glycol | 15.0% |
| Glycerol | 15.0% |
| N-hydroxyethyl-2-pyrrolidone | 5.0% |
| Surfactant (I-6) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 20

An ink composition was prepared following the procedure in Example 15 except for using the following composition. The pH of the mixture was adjusted to 9 by the addition of lithium hydroxide.

| Self-dispersible yellow colorant (PY74) | 13.0% |
|---|---|
| 1,3-propanediol | 22.5% |
| Glycerol | 7.5% |
| 2-pyrrolidone | 5.0% |
| Surfactant (II-1) | 2.0% |
| 2-ethyl-1,3-hexanediol | 2.0% |
| Emulsion | 3.0% |
| PROXEL LV (preservative) | 0.2% |
| Ion-exchange water | Balance |

Example 21

An ink composition was prepared following the procedure in Example 15 except for using the following composition. The pH of the mixture was adjusted to 9 by the addition of lithium hydroxide.

| | |
|---|---|
| Self-dispersible cyan colorant | 14.0% |
| 1,4-butanediol | 22.5% |
| Glycerol | 7.5% |
| N-methyl-2-pyrrolidone | 2.0% |
| Surfactant (II-2) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 22

An ink composition was prepared following the procedure in Example 15 except for using the following composition. The pH of the mixture was adjusted to 9 by the addition of lithium hydroxide.

| | |
|---|---|
| Self-dispersible quinacridon colorant | 10.0% |
| 1,5-pentanediol | 15.0% |
| Glycerol | 15.0% |
| N-hydroxyethyl-2-pyrrolidone | 2.0% |
| Surfactant (II-3) | 2.0% |
| 2-ethyl-1,3-hexanediol | 2.0% |
| Emulsion | 3.0% |
| PROXEL LV (preservative) | 0.2% |
| Ion-exchange water | Balance |

Example 23

An ink composition was prepared following the procedure in Example 15 except for using the following composition. The pH of the mixture was adjusted to 9 by the addition of lithium hydroxide.

| | |
|---|---|
| Self-dispersible yellow colorant (PY74) | 11.0% |
| 1,6-hexanediol | 22.5% |
| Glycerol | 7.5% |
| 2-pyrrolidone | 3.0% |
| Surfactant (II-4) | 2.0% |
| 2,2,4-trimethyl-1,3-pentanediol | 2.0% |
| PROXEL LV (preservative) | 0.2% |
| Ion-exchange water | Balance |

Example 24

An ink composition was prepared following the procedure in Example 15 except for using the following composition. The pH of the mixture was adjusted to 9 by the addition of sodium hydroxide.

| | |
|---|---|
| Self-dispersible yellow colorant (cationized PY 74) | 8.0% |
| 2-methyl-2,4-pentanediol | 22.5% |
| Glycerol | 7.5% |
| N-methyl-2-pyrrolidone | 5.0% |
| Surfactant (III, in which R = C6, k = 5) | 2.0% |
| 2-ethyl-1,3-hexanediol | 2.0% |
| PROXEL LV (preservative) | 0.2% |
| Ion-exchange water | Balance |

Example 25

An ink composition was prepared following the procedure in Example 15 except for using the following composition. The pH of the mixture was adjusted to 9 by the addition of sodium hydroxide.

| | |
|---|---|
| Self-dispersible cyan colorant | 8.0% |
| 1,2,6-hexanetriol | 30.0% |
| Glycerol | 10.0% |
| N-hydroxyethyl-2-pyrrolidone | 5.0% |
| Surfactant (IV, in which R = C6, n = 5) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 26

An ink composition was prepared following the procedure in Example 15 except for using the following composition. The pH of the mixture was adjusted to 9 by the addition of sodium hydroxide.

| | |
|---|---|
| Self-dispersible quinacridon colorant | 10.0% |
| Trimethylolpropane | 20.0% |
| Glycerol | 20.0% |
| 2-pyrrolidone | 4.0% |
| Surfactant (V, in which R = C6, n = 2, M = 3) | 2.0% |
| 2-ethyl-1,3-hexanediol | 2.0% |
| Emulsion | 3.0% |
| PROXEL LV (preservative) | 0.2% |
| Ion-exchange water | Balance |

Example 27

An ink composition was prepared following the procedure in Example 15 except for using the following composition. The pH of the mixture was adjusted to 9 by the addition of lithium hydroxide.

| | |
|---|---|
| Self-dispersible yellow colorant (PY74) | 8.0% |
| Trimethylolethane | 22.5% |
| Glycerol | 7.5% |
| N-methyl-2-pyrrolidone | 2.0% |
| Surfactant (VI), a mixture of a compound (p + q = 15) and a compound (p + q = 0) | 2.0% |
| 2,2,4-trimethyl-1,3-pentanediol | 2.0% |
| PROXEL LV (preservative) | 0.2% |
| Ion-exchange water | Balance |

Example 28

An ink composition was prepared following the procedure in Example 15 except for using the following composition. The pH of the mixture was adjusted to 9 by the addition of lithium hydroxide.

| | |
|---|---|
| Self-dispersible Cyan colorant | 6.0% |
| Urea | 22.5% |
| Glycerol | 7.5% |
| N-hydroxylethyl-2-pyrrolidone | 5.0% |
| ECTD-3NEX (anionic surfactant, Nikko Chemicals Col, Ltd.) | 2.0% |
| 2-ethyl-1,3-hexanediol | 2.0% |
| Emulsion | 3.0% |

-continued

| | |
|---|---|
| PROXEL LV (preservative) | 0.2% |
| Ion-exchange water | Balance |

Example 29

An ink composition was prepared following the procedure in Example 15 except for using the following composition. The pH of the mixture was adjusted to 9 by the addition of lithium hydroxide.

| | |
|---|---|
| Self-dispersible magenta dispersion | 6.0% |
| 1,3-dimethylimidazolidinone | 15.0% |
| Glycerol | 15.0% |
| 2-pyrrolidone | 5.0% |
| ECTD-6NEX (anionic surfactant, Nikko Chemicals Col, Ltd.) | 2.0% |
| 2,2,4-trimethyl-1,3-pentanediol | 2.0% |
| Emulsion | 3.0% |
| PROXEL LV (preservative) | 0.2% |
| Ion-exchange water | Balance |

Example 30

An ink composition was prepared following the procedure in Example 15 except for using the following composition. The pH of the mixture was adjusted to 9 by the addition of lithium hydroxide.

| | |
|---|---|
| Self-dispersible yellow colorant (PY74) | 6.0% |
| maltitose | 25.0% |
| Glycerol | 15.0% |
| N-methyl-2-pyrrolidone | 5.0% |
| Disphenol TOC (non-ionic surfactant, NOF Corporation) | 2.0% |
| 2-ethyl-1,3-hexanediol | 2.0% |
| Emulsion | 3.0% |
| PROXEL LV (preservative) | 0.2% |
| Ion-exchange water | Balance |
| Black colorant ink | |

An ink composition was prepared following the procedure in Example 15 except for using the following composition. The pH of the mixture was adjusted to 9 by the addition of sodium hydroxide.

| | |
|---|---|
| Diazo compound-treated carbon black dispersion | 12.0% (carbon black solid concentration) |
| Dipropylene glycol | 20.0% |
| Glycerol | 10.0% |
| N-hydroxyethyl-2-pyrrolidone | 5.0% |
| Surfactant (I-3) | 2.0% |
| 2-ethyl-1,3-hexanediol | 2.0% |
| Emulsion | 3.0% |
| PROXEL LV (preservative) | 0.2% |
| Ion-exchange water | Balance |

Comparative Example 6

Ingredients as described below was mixed together and treated with 10% aqueous solution of lithium hydroxide to adjust its pH to 9. The thus obtained mixture was filtered through a membrane filter with an average pore size of 0.8 μm to obtain an ink composition.

| | |
|---|---|
| Self-dispersible cyan colorant | 5.0% |
| Ethylene glycol | 15.0% |
| Glycerol | 5.0% |
| 2-pyrrolidone | 2.0% |
| ECTD-3NEX (anionic surfactant, Nikko Chemicals Col, Ltd.) | 1.0% |
| 2-ethyl-1,3-hexanediol | 2.0% |
| Emulsion | 3.0% |
| PROXEL LV (preservative) | 0.2% |
| Ion-exchange water | Balance |

Comparative Example 7

An ink composition was prepared following the procedure in Comparative Example 6 except for using the following composition. The pH of the mixture was adjusted to 9 by the addition of lithium hydroxide.

| | |
|---|---|
| Self-dispersible quinacridon colorant | 5.0% |
| Diethylene glycol | 15.0% |
| Glycerol | 5.0% |
| N-methyl-2-pyrrolidone | 2.0% |
| ECTD-6NEX (anionic surfactant, Nikko Chemicals Co., Ltd.) | 1.0% |
| 2,2,4-trimethyl-1,3-pentanediol | 2.0% |
| PROXEL LV (preservative) | 0.2% |
| Ion-exchange water | Balance |

Comparative Example 8

An ink composition was prepared following the procedure in Comparative Example 6 except for using the following composition. The pH of the mixture was adjusted to 9 by the addition of lithium hydroxide.

| | |
|---|---|
| Self-dispersible yellow colorant (PY74) | 3.0% |
| Triethylene glycol | 15.0% |
| Glycerol | 5.0% |
| N-hydroxyethyl-2-pyrrolidone | 2.0% |
| Disphenol TOC (non-ionic surfactant, NOF Corporation) | 1.0% |
| 2-ethyl-1,3-hexanediol | 2.0% |
| Emulsion | 3.0% |
| PROXEL LV (preservative) | 0.2% |
| Ion-exchange water | Balance |

Comparative Example 9

An ink composition was prepared following the procedure in Example 15 except for using the following composition. The pH of the mixture was adjusted to 9 by the addition of sodium hydroxide.

| | |
|---|---|
| Polymeric dispersant-dispersed quinacridon colorant (PR122) | 4.0% (pigment solid content) |
| Ethylene glycol | 15.0% |
| Glycerol | 5.0% |
| 2-pyrrolidone | 2.0% |
| ECTD-6NEX (anionic surfactant, Nikko Chemicals Col, Ltd.) | 1.0% |
| 2,2,4-trimethyl-1,3-pentanediol | 2.0% |
| PROXEL LV (preservative) | 0.2% |
| Ion-exchange water | Balance |

Comparative Example 10

An ink composition was prepared following the procedure in Example 15 except for using the following composition.

The pH of the mixture was adjusted to 9 by the addition of lithium hydroxide.

| | |
|---|---|
| Surfactant-dispersed phthalocyanine colorant (PB15:3) | 3.0% (pigment solid content) |
| Diethylene glycol | 15.0% |
| Glycerol | 5.0% |
| N-methyl-2-pyrrolidone | 2.0% |
| ECTD-6NEX (anionic surfactant, Nikko Chemicals Col, Ltd.) | 1.0% |
| 2,2,4-trimethyl-1,3-pentanediol | 2.0% |
| Emulsion | 3.0% |
| PROXEL LV (preservative) | 0.2% |
| Ion-exchange water | Balance |

Concentrations of colorants and humectants of ink compositions prepared in Examples 15 to 30, cyan, magenta and yellow colorant ink compositions, and ink compositions prepared in Comparative Examples 6 to 10 are shown in Table 2 below.

TABLE 2

| | Pigment solid content (% by weight) | Humectant content (% by weight) | Viscosity (mPa · s, at 25° C.) |
|---|---|---|---|
| Example 15 | 8.0 | 30.0 | 7.26 |
| Example 16 | 10.0 | 40.0 | 10.57 |
| Black colorant ink | 12.0 | 30.0 | 9.53 |
| Example 17 | 10.0 | 30.0 | 8.13 |
| Example 18 | 9.0 | 30.0 | 8.06 |
| Example 19 | 10.0 | 30.0 | 8.97 |
| Example 20 | 13.0 | 30.0 | 9.58 |
| Example 21 | 14.0 | 30.0 | 9.36 |
| Example 22 | 10.0 | 30.0 | 8.41 |
| Example 23 | 11.0 | 30.0 | 8.32 |
| Example 24 | 8.0 | 30.0 | 7.31 |
| Example 25 | 8.0 | 40.0 | 9.59 |
| Example 26 | 10.0 | 40.0 | 10.73 |
| Example 27 | 8.0 | 30.0 | 7.26 |
| Example 28 | 6.0 | 30.0 | 6.80 |
| Example 29 | 6.0 | 30.0 | 7.18 |
| Example 30 | 6.0 | 40.0 | 9.03 |
| Comp. Example 6 | 3.0 | 20.0 | 2.55 |
| Comp. Example 7 | 4.0 | 20.0 | 2.89 |
| Comp. Example 8 | 3.0 | 20.0 | 2.77 |
| Comp. Example 9 | 4.0 | 20.0 | 3.20 |
| Comp. Example 10 | 3.0 | 20.0 | 2.74 |

The ink compositions prepared in Examples 1 to 30 and Comparative Examples 1 to 10 were subjected to the following test.
1) Resolution of Image Printing was performed on papers listed below using an ink jet printer EM-900 (Seiko Epson Corporation) while varying driving voltage, frequency and pulse width. A pattern was printed with each of the yellow, magenta and cyan color ink at 100% duty while simultaneously printing characters using the black ink of the present invention. The printing was conducted under conditions including Mj of 35 pl, Vj of 20 m/sec, frequency of 1 kHz and recording density of 360 dpi in the one-pass printing mode.

Full-page letter printing was performed using an ink jet printer BJC430 of a bubble jet type (Canon) and an ink jet printer hp diskjet 815 of a bubble jet type (HP) with a BK cartridge under conditions including Mj of 35 pl, Vj of 20 m/sec, frequency of 1 kHz and recording density of 360 dpi in the one-pass printing mode.

Full-page letter printing was performed using an ink jet printer IPSiO Jet300 (Ricoh) under conditions of 1) and 2) with varied driving voltage of the head, frequency and pulse width in the one-pass printing style.

After drying the printed pattern or characters, blurring on the interface between two colors, image blurring, color tone, image density was observed with the naked eyes and synthetically examined using a reflective color spectrodensitometer (X-Rite). The data was judged according to the criteria described below. The papers used in this test were as follows.

1) My paper (NBS Ricoh Co., Ltd.)
2) Paper-origin S reclaimed paper (NBS Ricoh Co., Ltd.)
3) PB paper (Canon Inc.)
4) MultiAce (Fuji Xerox Office Supply)
5) Yamauri paper (reclaimed paper, Honshu Paper Co., Ltd.)
6) LH paper (Fuji Xerox Office Supply)
7) Xerox 4024 paper (Fuji Xerox Office Supply)
8) Neenah Bond paper (Kimberly Clark)

Criteria

⊚: No blurring was observed through the paper, clear printing

○: Beard-shaped blurring was observed in some parts of the paper

Δ: Beard-shaped blurring was observed through the paper

X: Blurring occurred severely and the outlines of characters were not apparent

2) Drying Characteristics of Image

A filtering paper was placed on a printed image and a pressure was exerted on the paper under predetermined conditions. Time required until the ink did not transfer to the filtering paper was measured. The ink composition which was dried in 10 seconds was expressed as ○.

3) Storage Stability

Each of the ink compositions was placed in a polyethylene container and stored at −20° C., 5° C., 20° C. and 70° C. under various conditions for three months. After storing, the surface tension, viscosity and occurrence of precipitates were examined. The ink which did not show any change in the properties after storing under various conditions was expressed as ○.

4) Reliability of Ink-ejecting Performance After Resumed Intermission.

This test was performed using a head of a Printer IPSiO Jet300 (Ricoh). It was examined whether the printing operation could be performed smoothly when the printing was again started after intermission of a certain period of time without capping or cleaning. The reliability was evaluated by measuring the deviation of ejecting direction or the change of the weight of an ejected ink droplet. Results are shown in Table 3 and Table 4.

TABLE 3

| | Feathering | Color breeding | Optical density | Residual trace | dryness | Storage stability | Reliability |
|---|---|---|---|---|---|---|---|
| Example 1 | ⊚ | ⊚ | 1.51 | 0.02 | 1 sec > | ○ | 600 sec < |
| Example 2 | ⊚ | ⊚ | 1.45 | 0.05 | 1 sec > | ○ | 600 sec < |
| Example 3 | ⊚ | ⊚ | 1.49 | 0.04 | 1 sec > | ○ | 600 sec < |
| Example 4 | ⊚ | ⊚ | 1.40 | 0.02 | 1 sec > | ○ | 600 sec < |
| Example 5 | ⊚ | ⊚ | 1.42 | 0.07 | 1 sec > | ○ | 600 sec < |
| Example 6 | ⊚ | ⊚ | 1.51 | 0.02 | 1 sec > | ○ | 600 sec < |
| Example 7 | ⊚ | ⊚ | 1.46 | 0.05 | 1 sec > | ○ | 600 sec < |
| Example 8 | ⊚ | ⊚ | 1.48 | 0.04 | 1 sec > | ○ | 600 sec < |
| Example 9 | ⊚ | ⊚ | 1.45 | 0.04 | 1 sec > | ○ | 600 sec < |
| Example 10 | ⊚ | ⊚ | 1.39 | 0.05 | 1 sec > | ○ | 600 sec < |
| Example 11 | ⊚ | ⊚ | 1.42 | 0.04 | 1 sec > | ○ | 600 sec < |
| Example 12 | ⊚ | ⊚ | 1.50 | 0.03 | 1 sec > | ○ | 600 sec < |
| Example 13 | ⊚ | ⊚ | 1.53 | 0.02 | 1 sec > | ○ | 600 sec < |
| Example 14 | ⊚ | ⊚ | 1.48 | 0.05 | 1 sec > | ○ | 600 sec < |
| Comp. Example 1 | ○ | ○ | 1.21 | 0.25 | 1 sec > | ○ | 600 sec < |
| Comp. Example 2 | ○ | △ | 1.22 | 0.29 | 1 sec > | ○ | 600 sec < |
| Comp. Example 3 | ○ | ○ | 1.24 | 0.24 | 1 sec > | ○ | 600 sec < |
| Comp. Example 4 | △ | △ | 1.22 | 0.26 | 1 sec > | ○ | 600 sec < |
| Comp. Example 5 | ○ | ○ | 1.18 | 0.30 | 1 sec > | ○ | 600 sec < |

TABLE 4

| | Feathering | Color breeding | Optical density | Residual trace | dryness | Storage stability | Reliability |
|---|---|---|---|---|---|---|---|
| Example 15 | ⊚ | ⊚ | 1.37 | 0.04 | 1 sec > | ○ | 600 sec < |
| Example 16 | ⊚ | ⊚ | 1.23 | 0.03 | 1 sec > | ○ | 600 sec < |
| Example 17 | ⊚ | ⊚ | 1.10 | 0.02 | 1 sec > | ○ | 600 sec < |
| Example 18 | ⊚ | ⊚ | 1.34 | 0.06 | 1 sec > | ○ | 600 sec < |
| Example 19 | ⊚ | ⊚ | 1.25 | 0.03 | 1 sec > | ○ | 600 sec < |
| Example 20 | ⊚ | ⊚ | 1.13 | 0.04 | 1 sec > | ○ | 600 sec < |
| Example 21 | ⊚ | ⊚ | 1.30 | 0.04 | 1 sec > | ○ | 600 sec < |
| Example 22 | ⊚ | ⊚ | 1.21 | 0.03 | 1 sec > | ○ | 600 sec < |
| Example 23 | ⊚ | ⊚ | 1.13 | 0.03 | 1 sec > | ○ | 600 sec < |
| Example 24 | ⊚ | ⊚ | 1.28 | 0.04 | 1 sec > | ○ | 600 sec < |
| Example 25 | ⊚ | ⊚ | 1.25 | 0.03 | 1 sec > | ○ | 600 sec < |
| Example 26 | ⊚ | ⊚ | 1.27 | 0.04 | 1 sec > | ○ | 600 sec < |
| Example 27 | ⊚ | ⊚ | 1.11 | 0.03 | 1 sec > | ○ | 600 sec < |
| Example 28 | ⊚ | ⊚ | 1.28 | 0.05 | 1 sec > | ○ | 600 sec < |
| Example 29 | ⊚ | ⊚ | 1.24 | 0.03 | 1 sec > | ○ | 600 sec < |
| Example 30 | ⊚ | ⊚ | 1.13 | 0.02 | 1 sec > | ○ | 600 sec < |
| Comp. Example 6 | ○ | ○ | 1.05 | 0.15 | 1 sec > | ○ | 600 sec < |
| Comp. Example 7 | ○ | ○ | 0.98 | 0.18 | 1 sec > | ○ | 600 sec < |
| Comp. Example 8 | ○ | △ | 0.85 | 0.16 | 1 sec > | ○ | 600 sec < |
| Comp. Example 9 | △ | △ | 0.95 | 0.23 | 1 sec > | ○ | 600 sec < |
| Comp. Example 10 | ○ | △ | 1.06 | 0.30 | 1 sec > | ○ | 600 sec < |

Example B-1

The purity of EHD "Octanediol" (Kyowa Hakko Kogyo Co., Ltd.) was measured by gas chromatography (HP) to confirm that the content of butyric ester is in the range of 0.05 to 1% by weight.

Using the EHD, an ink composition of the following ingredients was prepared. Odor during preparation of the ink was not offensive.

| Black ink composition | |
|---|---|
| CABO-JET300 (Cabot Specialty Chemicals Inc. CSCI) | 8% by weight |
| EHD (Kyowa Hakko Kogyo Co., Ltd.) | 2% by weight |
| Diethylene glycol | 15% by weight |
| Glycerol | 5% by weight |
| 2-pyrrolidone | 2% by weight |
| ECTD-3NEX (Nikko Chemicals Co., Ltd.) | 1% by weight |
| PROXEL LV (preservative) | 0.4% by weight |
| Ion-exchange water | Balance |

An Example B-1 ink prepared by mixing the above-listed ingredients altogether was stirred at a room temperature and treated with 10% aqueous solution of lithium hydroxide to adjust its pH to 10.5. The thus obtained mixture was filtered through a membrane filter with an average pore size of 0.8 μm to obtain an ink composition.

The ink was examined for the reliability after storage for a long period of time and generation of offensive odor during preparation of the ink.

Test 1: Reliability After Long Period of Storage

The ink was filled into an ink jet printer having a nozzle 300 GSL employing a laminate PZT with a nozzle plate made of nickel for pressing the ink flow path. The printer was left for three months in a state of being capped. The printing was performed without a cleaning operation of wiping, vacuuming and the like purging procedures or after one cycle of a cleaning operation. The pixel size and accuracy of dot position after storage were compared with the same data before the storage.

Criteria was determined as follows: when the pixel size and accuracy of dot position did not change without the cleaning operation, the ink was judged as "good"; when the pixel size and accuracy of dot position was recovered after one cycle of the cleaning operation, the ink was judged as "slight poor"; when an additional cleaning operation was needed, the ink was judged as "poor". However, the ink was found to be "good".

Reference Example C-1

Preparation of Dispersion of Polymer Particles Containing Phthalocyanine Colorant Following the Preparation Example 3 described in Japanese Patent Application Laid Open No.2001-139849, a blue colorant dispersion of polymer particles was prepared.

The average particle diameter of polymer particles (D50%) was 93 nm, as measured by a Microtrack UPA.

Reference Example C-2

Preparation of Dispersion of Polymer Particles Containing Dimethylquinacridone Colorant A red-violet colorant dispersion of polymer particles was prepared following the procedure in Reference Example C-1 except for substituting phthalocyanine colorant with colorant red 122. The average particle diameter of polymer particles (D50%) was 127 nm, as measured by a Microtrack UPA.

Reference Example C-3

Preparation of Dispersion of Polymer Particles Containing Monoazo Yellow Colorant A yellow colorant dispersion of polymer particles was prepared following the procedure in Reference Example C-1 except for substituting phthalocyanine colorant with colorant yellow 74. The average particle diameter of polymer particles (D50%) was 76 nm, as measured by a Microtrack UPA.

Reference Example C-4

Preparation of Dispersion of Polymer Particles Containing Carbon Black

A black colorant dispersion of polymer particles was prepared following the procedure in Reference Example C-1 except for substituting phthalocyanine colorant with carbon black (FW100, Degussa). The average particle diameter of polymer particles (D50%) was 104 nm, as measured by a Microtrack UPA.

Reference Example C-5

Carbon Black Dispersion 1 Treated with Diazo Compound 100 g of carbon black having a surface area of 230 $m^2/g$ and DBP oil absorption of 70 ml/100 g and 34 g of p-amino-N-benzoic acid were dispersed in 750 g of water. 16 g of nitric acid was added dropwise to the dispersion and stirred at 70° C. After five minutes, a solution of 11 g of sodium nitrite dissolved in 50 g of water was added to the dispersion and stirred for one hour. The resulting slurry was diluted to 10 times and centrifuged to remove coarse particles. The solution was treated with diethanolamine to set pH to 8 to 9. The solution was concentrated and desalted by a ultrafiltration membrane to form a carbon black dispersion with a colorant concentration of 15% by weight. The dispersion was filtered by a polypropylene filter of 0.5 $\mu$m to obtain a carbon black dispersion 1. The average particle diameter (D50%) was found to be 99 nm.

Reference Example C-6

Carbon Black Dispersion 2 Treated with Hypochlorite 300 g of commercially available acid carbon black (pH 2.5), supplied by Cabot under a trade name of Monarch 1300, was mixed with 1000 ml of water and 450 g of hypochlorite (effective chlorine concentration: 12%) was added dropwise thereto and heated to 100 to 105° C. for eight hours while stirring. To the resulting solution, 100 g of hypochlorite (effective chlorine concentration 12%) was added and dispersed for three hours using a horizontal homogenizer. The slurry was diluted to 10 times with water. After treated with lithium hydroxide to adjust pH, the solution was concentrated and desalted using a ultrafiltration membrane to a conductivity of 0.2 mS/cm to form a carbon black dispersion with a colorant concentration of 15% by weight. The dispersion was centrifuged to remove coarse particles and then, filtered by a nylon filter of 1 $\mu$m to obtain a carbon black dispersion 2. The average particle diameter (D50%) was found to be 95 nm, as measured by a Microtrack UPA.

Reference Example C-7

Carbon Black Dispersion 3 Treated with Sulfonating Agent 150 g of commercially available carbon black colorant, supplied by Degussa under a trade name of Printex#85, was mixed with 400 ml of sulfolane. The mixture was ground using a bead mill and stirred with 15 g of sulfonamide at 140 to 150° C. for 10 hours. The resulting slurry was added to 1000 ml of ion exchange water and centrifuged at 12000 rpm to obtain a surface-treated carbon black as a wet cake. The carbon black wet cake was redispersed in 2000 ml of ion exchange water and treated with lithium hydroxide to adjust pH. The solution was concentrated and desalted by a ultrafiltration membrane to form a carbon black dispersion with a colorant concentration of 10% by weight. The dispersion was filtered by a nylon filter of 1 $\mu$m to obtain a carbon black dispersion 3. The average particle diameter (D50%) was found to be 80 nm.

Reference Example C-8

Carbon Black Dispersion 4 Treated with Diazo Compound (Cationic)

A carbon black dispersion 4 was prepared following the procedure in Reference Example C-5 except for using N-(4-aminophenyl)pyridium chloride instead of p-amino-N-benzoic acid.

Now, the present invention is described using the following examples and comparative examples. However, the present invention is not limited thereto. The amounts (%) of ingredients described in the examples are based on the weight.

Example C-1

Ingredients as described below was mixed together and treated with 10% aqueous solution of lithium hydroxide to adjust its pH to 9. The thus obtained mixture was filtered through a membrane filter with an average pore size of 0.8 μm to obtain an ink composition.

| | |
|---|---|
| Polymer particles containing phthalocyanine of Reference Example C-1 | 8.0% (solid content) |
| Triethylene glycol | 22.5% by weight |
| Glycerol | 7.5% by weight |
| 2-pyrrolidone | 5.0% by weight |
| Surfactant concretely expressed as the surfactant (I-1) | 2.0% by weight |
| 2-ethyl-1,3-hexanediol | 2.0% by weight |
| PROXEL LV (preservative) | 0.2% by weight |
| Ion-exchange water | Balance |

Example C-2

An ink composition was prepared following the procedure in Example C-1 except for using the following composition. The pH of the mixture was adjusted to 9 by the addition of lithium hydroxide.

| | |
|---|---|
| Polymer particles containing dimethylquinacridone colorant of Reference Example C-2 | 8.0% by weight (solid content) |
| Propylene glycol | 30.0% by weight |
| Glycerol | 10.0% by weight |
| N-methyl-2-pyrrolidone | 2.0% by weight |
| Surfactant concretely expressed as the surfactant (I-2) | 2.0% by weight |
| 2,2,4-trimethyl-1,3-pentanediol | 2.0% by weight |
| PROXEL LV (preservative) | 0.2% by weight |
| Ion-exchange water | Balance |

Example C-3

An ink composition was prepared following the procedure in Example C-1 except for using the following composition. The pH of the mixture was adjusted to 9 by the addition of lithium hydroxide.

| | |
|---|---|
| Polymer particles containing monoazo yellow colorant of Reference Example C-3 | 8.0% by weight (solid content) |
| 1,3-butanediol | 22.5% by weight |
| Glycerol | 7.5% by weight |
| 2-pyrrolidone | 5.0% by weight |
| Surfactant concretely expressed as the surfactant (I-4) | 2.0% by weight |
| 2,2,4-trimethyl-1,3-pentanediol | 2.0% by weight |
| PROXEL LV (preservative) | 0.2% by weight |
| Ion-exchange water | Balance |

Example C-4

An ink composition was prepared following the procedure in Example C-1 except for using the following composition. The pH of the mixture was adjusted to 9 by the addition of sodium hydroxide.

| | |
|---|---|
| Polymer particles containing carbon black of Reference Example C-4 | 8.0% by weight (solid content) |
| Dipropylene glycol | 20.0% by weight |
| Glycerol | 10.0% by weight |
| N-hydroxyethyl-2-pyrrolidone | 5.0% by weight |
| Surfactant concretely expressed as the surfactant (I-3) | 2.0% by weight |
| 2-ethyl-1,3-hexanediol | 2.0% by weight |
| PROXEL LV (preservative) | 0.2% by weight |
| Ion-exchange water | Balance |

Example C-5

An ink composition was prepared following the procedure in Example C-1 except for using the following composition. The pH of the mixture was adjusted to 9 by the addition of lithium hydroxide.

| | |
|---|---|
| Polymer particles containing phthalocyanine colorant of Reference Example C-1 | 12.0% by weight (solid content) |
| 2,3-butanediol | 22.5% by weight |
| Glycerol | 7.5% by weight |
| N-methyl-2-pyrrolidone | 3.0% by weight |
| Surfactant concretely expressed as the surfactant (I-5) | 2.0% by weight |
| 2,3-ethyl-1,3-hexanediol | 2.0% by weight |
| PROXEL LV (preservative) | 0.2% by weight |
| Ion-exchange water | Balance |

Example C-6

An ink composition was prepared following the procedure in Example C-1 except for using the following composition. The pH of the mixture was adjusted to 9 by the addition of lithium hydroxide.

| | |
|---|---|
| Polymer particles containing dimethylquinacridone colorant of Reference Example C-2 | 12.0% by weight (solid content) |
| Dipropylene glycol | 15.0% by weight |
| Glycerol | 15.0% by weight |
| N-hydroxyethyl-2-pyrrolidone | 5.0% by weight |
| Surfactant concretely expressed as the surfactant (I-6) | 2.0% by weight |
| 2,2,4-trimethyl-1,3-pentanediol | 2.0% by weight |
| PROXEL LV (preservative) | 0.2% by weight |
| Ion-exchange water | Balance |

Example C-7

An ink composition was prepared following the procedure in Example C-1 except for using the following composition. The pH of the mixture was adjusted to 9 by the addition of lithium hydroxide.

| | |
|---|---|
| Polymer particles containing monoazo yellow colorant of Reference Example C-3 | 12.0% by weight (solid content) |
| 1,3-propanediol | 22.5% by weight |
| Glycerol | 7.5% by weight |

| | |
|---|---|
| 2-pyrrolidone | 5.0% by weight |
| Surfactant concretely expressed as the surfactant (II-1) | 2.0% by weight |
| 2-ethyl-1,3-hexanediol | 2.0% by weight |
| PROXEL LV (preservative) | 0.2% by weight |
| Ion-exchange water | Balance |

Example C-8

An ink composition was prepared following the procedure in Example C-1 except for using the following composition. The pH of the mixture was adjusted to 9 by the addition of lithium hydroxide.

| | |
|---|---|
| Carbon black dispersion 1 treated with diazo compound of Reference Example C-5 | 8.0% by weight (solid content) |
| 1,4-butanediol | 22.5% by weight |
| Glycerol | 7.5% by weight |
| N-methyl-2-pyrrolidone | 2.0% by weight |
| Surfactant concretely expressed as the surfactant (II-2) | 2.0% by weight |
| 2,2,4-trimethyl-1,3-pentanediol | 2.0% by weight |
| Emulsion | 3.0% by weight |
| PROXEL LV (preservative) | 0.2% by weight |
| Ion-exchange water | Balance |

Example C-9

An ink composition was prepared following the procedure in Example C-1 except for using the following composition. The pH of the mixture was adjusted to 9 by the addition of lithium hydroxide.

| | |
|---|---|
| Polymer particles containing phthalocyanine colorant of Reference Example C-1 | 15.0% by weight (solid content) |
| 1,5-pentanediol | 15.0% by weight |
| Glycerol | 15.0% by weight |
| N-hydroxyethyl-2-pyrrolidone | 2.0% by weight |
| Surfactant concretely expressed as the surfactant (II-3) | 2.0% by weight |
| 2-ethyl-1,3-hexanediol | 2.0% by weight |
| PROXEL LV (preservative) | 0.2% by weight |
| Ion-exchange water | Balance |

Example C-10

An ink composition was prepared following the procedure in Example C-1 except for using the following composition. The pH of the mixture was adjusted to 9 by the addition of lithium hydroxide.

| | |
|---|---|
| Polymer particles containing dimethylquinacridone colorant of Reference Example C-2 | 15.0% by weight (solid content) |
| 1,6-hexanediol | 22.5% by weight |
| Glycerol | 7.5% by weight |
| 2-pyrrolidone | 3.0% by weight |
| Surfactant concretely expressed as the surfactant (II-4) | 2.0% by weight |
| 2,2,4-trimethyl-1,3-pentanediol | 2.0% by weight |
| PROXEL LV (preservative) | 0.2% by weight |
| Ion-exchange water | Balance |

Example C-11

An ink composition was prepared following the procedure in Example C-1 except for using the following composition. The pH of the mixture was adjusted to 9 by the addition of lithium hydroxide.

| | |
|---|---|
| Polymer particles containing monoazo yellow colorant of Reference Example C-3 | 15.0% by weight (solid content) |
| 2-methyl-2,4-pentanediol | 22.5% by weight |
| Glycerol | 7.5% by weight |
| N-methyl-2-pyrrolidone | 5.0% by weight |
| Surfactant expressed by the general formula (III, in which R = C6, k = 5) | 2.0% by weight |
| 2-ethyl-1,3-hexanediol | 2.0% by weight |
| PROXEL LV (preservative) | 0.2% by weight |
| Ion-exchange water | Balance |

Example C-12

An ink composition was prepared following the procedure in Example C-1 except for using the following composition. The pH of the mixture was adjusted to 9 by the addition of sodium hydroxide.

| | |
|---|---|
| Carbon black dispersion 2 treated with hypochlorite of Reference Example C-6 | 10.0% by weight (solid content) |
| 1,2,6-hexanetriol | 30.0% by weight |
| Glycerol | 10.0% by weight |
| N-hydroxyethyl-2-pyrrolidone | 5.0% by weight |
| Surfactant expressed by the general formula (IV, in which R = C6, n = 5) | 2.0% by weight |
| 2,2,4-trimethyl-1,3-pentanediol | 2.0% by weight |
| Emulsion | 3.0% by weight |
| PROXEL LV (preservative) | 0.2% by weight |
| Ion-exchange water | Balance |

Example C-13

An ink composition was prepared following the procedure in Example C-1 except for using the following composition. The pH of the mixture was adjusted to 9 by the addition of sodium hydroxide.

| | |
|---|---|
| Carbon black dispersion 3 treated with sulfonating agent of Reference Example C-7 | 10.0% by weight (solid content) |
| Trimethylolpropane | 20.0% by weight |
| Glycerol | 20.0% by weight |
| 2-pyrrolidone | 4.0% by weight |
| Surfactant expressed by the general formula (V, in which R = C6, n = 2, M = 3) | 2.0% by weight |
| 2-ethyl-1,3-hexanediol | 2.0% by weight |

-continued

| Emulsion | 3.0% by weight |
| PROXEL LV (preservative) | 0.2% by weight |
| Ion-exchange water | Balance |

Example C-14

An ink composition was prepared following the procedure in Example C-1 except for using the following composition. The pH of the mixture was adjusted to 9 by the addition of lithium hydroxide.

| | |
|---|---|
| Carbon black dispersion 4 treated with diazo compound (cationic) of Reference Example C-8 | 8.0% by weight (solid content) |
| Trimethylolethane | 22.5% by weight |
| Glycerol | 7.5% by weight |
| N-methyl-2-pyrrodine | 2.0% by weight |
| Surfactant expressed by the general formula (VI) a mixture of a compound (p + q = 15) and a compound (p + q = 0) | 2.0% by weight |
| 2,2,4-trimethyl-1,3-pentanediol | 2.0% by weight |
| Emulsion | 3.0% by weight |
| PROXEL LV (preservative) | 0.2% by weight |
| Ion-exchange water | Balance |

Concentrations of colorants and humectants, and viscosity of ink compositions prepared in Examples C-1 to 14 are shown in Table 5 below.

TABLE 5

| | Colorant solid Concentration (% by weight) | Humectant concentration (% by weight) | Viscosity mPa · s (25° C.) |
|---|---|---|---|
| Ink set 1 | | | |
| Example C-1 CYAN | 8.0 | 30.0 | 6.26 |
| Example C-2 MAG | 8.0 | 40.0 | 7.57 |
| Example C-3 YEL | 8.0 | 30.0 | 6.13 |
| Example C-4 BK | 8.0 | 30.0 | 8.06 |
| Ink set 2 | | | |
| Example C-5 CYAN | 12.0 | 30.0 | 8.91 |
| Example C-6 MAG | 12.0 | 30.0 | 9.58 |
| Example C-7 YEL | 12.0 | 30.0 | 9.16 |
| Example C-8 BK | 8.0 | 30.0 | 8.41 |
| Ink set 3 | | | |
| Example C-9 CYAN | 15.0 | 30.0 | 9.32 |
| Example C-10 MAG | 15.0 | 30.0 | 10.31 |
| Example C-11 YEL | 15.0 | 30.0 | 9.59 |
| Example C-12 BK | 10.0 | 40.0 | 10.73 |
| Ink set 4 | | | |
| Example C-13 BK | 10.0 | 40.0 | 7.26 |
| Ink set 5 | | | |
| Example C-14 BK | 8.0 | 30.0 | 6.80 |

The cyan, magenta, yellow black ink sets described in the Table 5 regarding the above Examples C-1 to C-14 were subjected to the following test.

In the ink sets 4 and 5, black ink in the ink set 2 was alternatively used.

1) Resolution of Image (1) Printing was performed on papers listed below using an ink jet printer EM-900 (Seiko Epson Corporation) while varying driving voltage, frequency and pulse width. A pattern was printed with each of the yellow, magenta and cyan color ink at 100% duty while simultaneously printing characters using the black ink of the present invention. The printing was conducted under conditions including Mj of 35 pl, Vj of 20 m/sec, frequency of 1 kHz and recording density of 360 dpi in the one-pass printing mode.

(2) Full-page letter printing was performed using an ink jet printer IPSiO Jet300 (Ricoh) under conditions of 1) with varied driving voltage of the head, frequency and pulse width in the one-pass printing style.

After drying the printed pattern or characters, blurring on the interface between two colors, image blurring, color tone, image density was observed with the naked eyes and synthetically examined using a reflective color spectrodensitometer (X-Rite). The data were judged according to the criteria described below. The papers used in this test were as follows.

(1) My paper (NBS Ricoh Co., Ltd.)
(2) Paper-origin S reclaimed paper (NBS Ricoh Co., Ltd.)
(3) PB paper (Canon Inc.)
(4) MultiAce (Fuji Xerox Office Supply)
(5) Yamauri paper (reclaimed paper, Honshu paper Co., Ltd.)
(6) LH paper (Fuji Xerox Office Supply)
(7) Xerox 4024 paper (Fuji Xerox Office Supply)
(8) Neenah Bond paper (Kimberly Clark)
Criteria ⊚: Any blurring was not observed through the paper, clear printing ○: Beard-shaped blurring was observed in some parts of the paper Δ: Beard-shaped blurring was observed through the paper : Blurring occurred severely and the outlines of characters were not apparent 2) Drying Characteristics of Image A filtering paper was placed on an printed image and a pressure was exerted on the paper under predetermined conditions. Time required until the ink did not transfer to the filtering paper was measured. The ink composition which was dried in 10 seconds was expressed ○.

3) Storage Stability

Each of the ink compositions was placed in a polyethylene container and stored at −20° C., 5° C., 20° C. and 70°

C. under various conditions for three months. After storing, the surface tension, viscosity and occurrence of precipitates were examined. The ink which did not show change of properties after storing under the various conditions was expressed ○.

4) Reliability of Ink-ejecting Performance When Stopped Printing

This test was performed using a head of a Printer IPSiO Jet300 (Ricoh). It was examined whether the printing operation could be performed smoothly when the printing was again started after intermission of a certain period of time without capping or cleaning. The reliability was evaluated by measuring the deviation of ejecting direction or the change of the weight of an ejected ink droplet.

TABLE 6

|  | Feathering | Color breeding | Optical density | Residual trace | dryness | Storage stability | Reliability |
|---|---|---|---|---|---|---|---|
| Ink set 1 |  |  |  |  |  |  |  |
| Example C-1 | ◉ | ◉ | 1.13 | 0.04 | 1 sec > | ○ | 600 sec < |
| Example C-2 | ◉ | ◉ | 1.11 | 0.03 | 1 sec > | ○ | 600 sec < |
| Example C-3 | ◉ | ◉ | 1.15 | 0.02 | 1 sec > | ○ | 600 sec < |
| Example C-4 | ◉ | ◉ | 1.32 | 0.06 | 1 sec > | ○ | 600 sec < |
| Ink set 2 |  |  |  |  |  |  |  |
| Example C-5 | ◉ | ◉ | 1.25 | 0.03 | 1 sec > | ○ | 600 sec < |
| Example C-6 | ◉ | ◉ | 1.22 | 0.04 | 1 sec > | ○ | 600 sec < |
| Example C-7 | ◉ | ◉ | 1.20 | 0.04 | 1 sec > | ○ | 600 sec < |
| Example C-8 | ◉ | ◉ | 1.42 | 0.03 | 1 sec > | ○ | 600 sec < |
| Ink set 3 |  |  |  |  |  |  |  |
| Example C-9 | ◉ | ◉ | 1.33 | 0.03 | 1 sec > | ○ | 600 sec < |
| Example C-10 | ◉ | ◉ | 1.26 | 0.04 | 1 sec > | ○ | 600 sec < |
| Example C-11 | ◉ | ◉ | 1.25 | 0.03 | 1 sec > | ○ | 600 sec < |
| Example C-12 | ◉ | ◉ | 1.50 | 0.04 | 1 sec > | ○ | 600 sec < |
| Ink set 4 |  |  |  |  |  |  |  |
| Example C-13 | ◉ | ◉ | 1.44 | 0.03 | 1 sec > | ○ | 600 sec < |
| Ink set 5 |  |  |  |  |  |  |  |
| Example C-14 | ◉ | ◉ | 1.42 | 0.05 | 1 sec > | ○ | 600 sec < |

Example D-1

Ingredients as described below was mixed together and treated with 10% aqueous solution of lithium hydroxide to adjust its pH to 9. The thus obtained mixture was filtered through a membrane filter with an average pore size of 0.8 μm to obtain an ink composition.

| Polymeric dispersant-dispersed carbon black dispersion (Dainichiseika Color & Chemicals Mfg. Co., Ltd.) | 8.0% by weight |
|---|---|
| 2-methyl-2,4-pentanediol | 22.5% by weight |
| Glycerol | 7.5% by weight |
| N-methyl-2-pyrrolidone | 5.0% by weight |
| Surfactant of the surfactant general formula (III, in which R = C6, k = 5) | 2.0% by weight |
| 2-ethyl-1,3-hexanediol | 2.0% by weight |
| PROXEL LV (preservative) | 0.2% by weight |
| Ion-exchange water | Balance |

Example D-2

An ink composition was prepared following the procedure in Example D-1 except for using the following composition. The pH of the mixture was adjusted to 9 by the addition of lithium hydroxide.

| Polymeric dispersant-dispersed carbon black dispersion (Mikuni Color Ltd.) | 8.0% by weight |
|---|---|
| Trimethylolethane | 22.5% by weight |
| Glycerol | 7.5% by weight |
| N-methyl-2-pyrrolidone | 2.0% by weight |
| Surfactant of the surfactant general formula (IV), a mixture of a compound (p + q = 15) and a compound (p + q) | 2.0% by weight |
| 2,2,4-trimethyl-1,3-pentanediol | 2.0% by weight |
| PROXEL LV (preservative) | 0.2% by weight |
| Ion-exchange water | Balance |

The black ink compositions of Examples D-1 and D-2 had viscosities of 11.56 mPa·s and 8.68 mPa·s, respectively.

The ink compositions prepared in Examples D-1 and D-2 were subjected to the following test. The results are shown in Table 6.

1) Resolution of Image (1) Printing was performed on papers listed below using an ink jet printer EM-900 (Seiko Epson Corporation) while varying driving voltage, frequency and pulse width. A pattern was printed with each of the yellow, magenta and cyan color ink at 100% duty while simultaneously printing characters using the black ink of the present invention. The printing was conducted under conditions including Mj of 35 pl, Vj of 20 m/sec, frequency of 1 kHz and recording density of 360 dpi in the one-pass printing mode.

(2) Full-page letter printing was performed using an ink jet printer BJC430 of a bubble jet type (Canon) and an ink jet printer hp diskjet815 of a bubble jet type (HP) with a BK cartridge under conditions including Mj of 35 pl, Vj of 20 m/sec, frequency of 1 kHz and recording density of 360 dpi in the one-pass printing mode.

without capping or cleaning. The reliability was evaluated by measuring the deviation of ejecting direction or the change of the weight of an ejected ink droplet. The results are shown in Table 6

TABLE 7

|  | Feathering | Color breeding | Optical density | Residual trace | dryness | Storage stability | Reliability |
|---|---|---|---|---|---|---|---|
| Example D-1 | ◎ | ◎ | 1.42 | 0.04 | 1 sec > | ○ | 600 sec < |
| Example D-2 | ◎ | ◎ | 1.48 | 0.05 | 1 sec > | ○ | 600 sec < |

(3) Full-page letter printing was performed using an ink jet printer IPSiO Jet300 (Ricoh) under conditions of 1) and 2) with varied driving voltage of the head, frequency and pulse width in the one-pass printing style.

After drying the printed pattern or characters, blurring on the interface between two colors, image blurring, color tone, image density was observed with the naked eyes and synthetically examined using a reflective color spectrodensitometer (X-Rite). The data were judged according to the criteria described below. The papers used in this test were as follows.

(1) My paper (NBS Ricoh Co., Ltd.)
(2) Paper-origin S reclaimed paper (NBS Ricoh Co., Ltd.)
(3) PB paper (Canon Inc.)
(4) MultiAce (Fuji Xerox Office Supply)
(5) Yamauri paper (reclaimed paper, Honshu Paper Co., Ltd.)
(6) LH paper (Fuji Xerox Office Supply)
(7) Xerox 4024 paper (Fuji Xerox Office Supply)
(8) Neenah Bond paper (Kimberly Clark)
Criteria ◎: Any blurring was not observed through the paper, clear printing ○: Beard-shaped blurring was observed in some parts of the paper Δ: Beard-shaped blurring was observed through the paper : Blurring occurred severely and the outlines of characters were not apparent 2) Drying Characteristics of Image A filtering paper was placed on an printed image and a pressure was exerted on the paper under predetermined conditions. Time required until the ink did not transfer to the filtering paper was measured. The ink composition which was dried in 10 seconds was expressed ○.

3) Storage Stability

Each of the ink compositions was placed in a polyethylene container and stored at −20° C., 5° C., 20° C. and 70° C. under various conditions for three months. After storing, the surface tension, viscosity and occurrence of precipitates were examined. The ink which did not show change of properties after storing under the various conditions was expressed ○.

4) Reliability of Ink-ejecting Performance When Stopped Printing

This test was performed using a head of a Printer IPSiO Jet300 (Ricoh). It was examined whether the printing operation could be performed smoothly when the printing was again started after intermission of a certain period of time As described above, by using the ink for ink jet recording according to the present invention which contains a colorant in an amount of 6% by weight or more based on the total weight of the ink, comprises at least one humectant and has a viscosity of 5.0 mPa·s at 25° C., it is possible to obtain a high quality image of a laser printer on plain paper in the one-pass printing mode under conditions, namely Mj of 5 to 43 pl, Vj of 6 to 20 m/sec, frequency of 1 kHz and resolution of 300 dpi or more (feathering and color breeding being comparable to a laser printer, with a image density of 1.4 to 1.5 (the conventional art: 1.1 to 1.2)).

Also, since the colorant is conglomerated on paper, off-setting is considerably reduced as compared to the conventional art, allowing two-sided printing (off-setting density 0.02 to 0.04/the conventional art: 0.2 to 0.3).

By using the ink for ink jet recording according to the present invention which contains a colorant in an amount of 6% by weight by weight or more based on the total weight of the ink, comprises at least one humectant selected from glycerin, 1,3-butanediol, triethylene glycol, 1,6-hexanediol, propylene glycol, 1,5-pentanediol, diethylene glycol, dipropylene glycol, trimethylolpropane and trimethylolethane and has a viscosity of 5.0 mPa·s and preferably 8.0 mPa·s or more, it is possible to obtain a high quality image of a laser printer on plain paper in the one-pass printing mode under conditions, namely Mj of 5 to 43 pl, Vj of 6 to 20 m/sec, frequency of 1 kHz and resolution of 300 dpi or more (feathering and color breeding being comparable to a laser printer, with a image density of 1.4 to 1.5 (the conventional art: 1.1 to 1.2)).

Also, since the colorant is conglomerated on paper, off-setting is considerably reduced as compared to the conventional art, allowing two-sided printing (off-setting density 0.02 to 0.04/the conventional art: 0.2 to 0.3).

In particular, the color ink for ink jet recording can address the problems of the conventional penetrating ink associated with the image quality, such as feathering, reduction of printing concentration, color breeding in the conventional art.

Also, by interaction between polyols having 8 to 11 carbon atoms and surfactants expressed by the formulae (I) to (VI), the ink has a surface tension of 40 dye/cm or less. Therefore, even an ink having a colorant content of at least 6% by weight and a high viscosity of 8.0 mPa·s, can be rapidly fixed on most image-receiving media, providing a sufficient marker resistance. Further, wettability of the ink to a head member is improved, whereby bubbles of the ink composition can be readily released and frequency response and ink-ejection stability are improved.

In addition, the ink according to the present invention, despite of its high colorant content and high viscosity ink, allow stable printing without clogging of a nozzle by virtue of at least humectant selected from glycerin, 1,3-butanediol, triethylene glycol, 1,6-hexanediol, propylene glycol, 1,5- pentanediol, diethylene glycol, dipropylene glycol, trimethylolpropane and trimethylolethane, as compared to the conventional art. Also, the ink according to the present invention has an improved storage stability as compared to the conventional high colorant content and high viscosity inks.

When using glycerin and at least one foregoing humectant other than glycerin, it is possible to obtain a high viscosity humectant mixture of glycerin and another humectant. Accordingly, it is possible to realize an ink of a high viscosity as well as a high colorant concentration.

By regulating a colorant concentration in the foregoing range, the viscosity of the ink is increased and the colorant is readily conglomerated on paper. As a result, the image density (OD) is improved and feathering phenomenon is inhibited.

By using a self-dispersible colorant containing carboxyl group, sulfone group, carbonyl group or hydroxyl group, it is possible to improve dispersion properties of the colorant in water.

By regulating the mixing ratio (w/w) of a humectant to a colorant in the foregoing range, the colorant can be stably dispersed in water, whereby drying properties, storage stability and reliability are improved.

By regulating a viscosity of the ink in the foregoing range, the printing quality is considerably improved. This high viscosity ink contains about 50% or less of water and hence, a water evaporation rate when an ink droplet collides against and adheres to a surface of paper becomes 2.0 to 3.0 times higher. As a result, the colorant of a high concentration can be fixed on a surface of paper in a high speed, whereby the blurring (feathering) phenomenon is inhibited.

When using 2-ehtyl-1,3-hexanediol or 2,2,4-trimethyl-1,3-pentaediol as polyol or glycolether, wettability of the ink to a heating element is improved. Accordingly, even a small amount of them can provide ejection stability and frequency stability.

By using a compound expressed by the formula (VII), the colorant in the ink of a high penetration rate can remain on paper. As a result, the image density (OD) is raised and feathering is inhibited.

A preferred humectant may further comprise a polyol, lactam, urea or saccharide.

The method for ink jet recording for ink jet recording according to the present invention may produce a high quality image without problems such as feathering, reduction of print density, color breeding and the like by performing printing using the ink according to the present invention.

When performing recording using the ink according to the present invention and the ink jet recording apparatus in which an ink control coating is formed on a nozzle plate of a recording head by common plating, fluctuation in ink droplet size and ejection failure can be prevented. Also, it is possible to obtain a high quality image without problems such as feathering, reduction of print density, color breeding and the like.

According to the present invention, there is provided a recording liquid cartridge for containing a recording liquid which can produce a image having a high quality, high reliability and stability due to its high penetration properties and a recording apparatus provided with the cartridge.

What is claimed is:

1. An ink for ink jet recording comprising:
   (1) a humectant which comprises at least one substance selected from glycerin, 1,3-butanediol, triethyleneglycol, 1,6-hexanediol, propyleneglycol, 1,5-pentanediol, diethyleneglycol, dipropyleneglycol, trimethylolpropane and trimethylolethane;
   (2) a colorant;
   (3) at least one of a) apolyol having 8 to 11 carbon atoms and b) a glycolether; and
   (4) at least one of a) anionic surfactants and b) non-ionic surfactants,
      wherein the colorant is contained in an amount of 6% by weight or more based on the total weight of the ink, and the ink has a viscosity of 5 mPa·s or more at 25° C.

2. The ink for ink jet recording according to claim 1, wherein the colorant is a self-dispersible colorant.

3. The ink for ink jet recording according to claim 2, wherein the self-dispersible colorant has a carboxyl group, a sulphone group, a carbonyl group and/or a hydroxyl group on the surface of the self-dispersible colorant.

4. The ink for ink jet recording according to claim 2, wherein the self-dispersible colorant has at least one hydrophilic group which is introduced by any one of diazo compound treatment, oxidization, hypochlorite treatment, sulphonation and fumic acid treatment on a surface of carbon black.

5. The ink for ink jet recording according to claim 1, wherein the colorant is a polymer emulsion which comprises a fine polymeric particles and a water-insoluble or poorly soluble colorant.

6. The ink for ink jet recording according to claim 1, wherein the colorant is used with a polymeric dispersant.

7. The ink for ink jet recording according to claim 1, wherein the content of the colorant is in a range of 8% by weight to 20% by weight based on the total weight of the ink.

8. The ink for ink jet recording according to claim 1, wherein the humectant comprises glycerin, and at least one substance selected from 1,3-butandiol, triethyleneglycol, 1,6-hexandiol, propyleneglycol, 1,5-pentandiol, diethyleneglycol, dipropyleneglycol, trimethylolpropane and trimethylolethane.

9. The ink for ink jet recording according to claim 8, wherein the self-dispersible colorant has an average particle diameter of 0.16 µm or less.

10. The ink for ink jet recording according to claim 1, wherein the humectant is contained in an amount of 10% by weight to 50% by weight based on the total weight of the ink.

11. The ink for ink jet recording according to claim 1, wherein the weight ratio of the humectant to the colorant is in a range of 0.5 to 8.0.

12. The ink for ink jet recording according to claim 11, wherein the weight ratio of the humectant to the colorant is in a range of 3.0 to 5.0.

13. The ink for ink jet recording according to claim 1, wherein the viscosity of the ink is in a range of 8 mPa·sec to 20 mPa·sec at 25° C.

14. The ink for ink jet recording according to claim 1, wherein one of the a) polyols having 8 to 11 carbon atoms and the b) glycolether is a) polyols having 8 to 11 carbon atoms.

15. The ink for ink jet recording according to claim 14, wherein the polyol having 8 to 11 carbon atoms is selected from diols having 8 to 11 carbon atoms.

16. The ink for ink jet recording according to claim 15, wherein the diol having 8 to 11 carbon atoms is one of a) 2-ethyl-1,3-hexanediol and b) 2,2,4-trimethyl-1,3-pentanediol.

17. The ink for ink jet recording according to claim 16, wherein one of the a) 2-ethyl-1,3-hexanediol and the b) 2,2,4-trimethyl-1,3-pentanediol is 2-ethyl-1,3-hexanediol and contains butyric ester compound in an amount of 0.05 to 1 by weight based on the weight of 2-ethyl-1,3-hexanediol.

18. The ink for ink jet recording according to claim 1, wherein one of the a) anionic surfactants and b) non-ionic surfactants is at least one selected from surfactants of the following formulae (I), (II), (III), (IV), (V) and (VI):

in which R1 is a straight or branched alkyl group having 6 to 14 carbon atoms, m is 3 to 12, and M is alkali metal ion, quaternary ammonium, quaternary phosphonium or alkanolamine;

in which R2 is a straight or branched alkyl group having 5 to 16 carbon atoms and M is alkali metal ion, quaternary ammonium, quaternary phosphonium or alkanolamine;

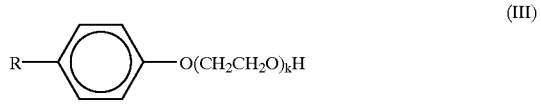

in which R is a straight or branched hydrocarbon chain having 6 to 14 carbon atoms and k is 5 to 20;

in which R is a straight or branched hydrocarbon chain having 6 to 14 carbon atoms and n is 5 to 20; and

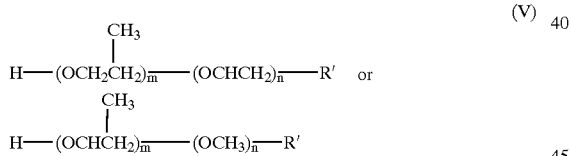

in which R' is a hydrocarbon chain having 6 to 14 carbon atoms, $m \leq 20$ and $n \leq 20$;

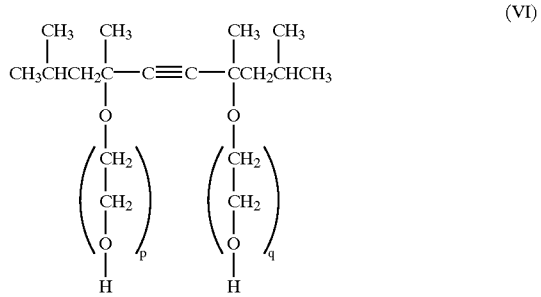

in which p and q are independently 0 to 40.

19. The ink for ink jet recording according to claim 1, wherein one of the a) anionic surfactants and the b) non-ionic surfactants is contained in an amount of 0.1% by weight to 5% by weight based on the total weight of the ink.

20. The ink for ink jet recording according to claim 1, wherein the ink further comprises a compound expressed by the following formula (VII):

in which n is an integer of 5, 7 or 8.

21. The ink for ink jet recording according to claim 1, wherein the ink further comprises at least one of polyols, lactams, ureas and saccharides.

22. The ink for ink jet recording according to claim 21, wherein the polyols are at least one selected from ethylenglycol, tetraethyleneglycol, polyethyleneglycol, tripropyleneglycol, 2,3-butanediol, 1,4-butanediol, 1,3-propanediol, 1,4-butanediol, 2-methyl-2,4-pentanediol, 1,2,4-butanetriol, 1,2,6-hexanetriol, thiodiglycol and pentaerythritol.

23. The ink for ink jet recording according to claim 21, wherein the lactams are at least one selected from 2-pyrrolidone, N-methyl-2-pyrrolidone, N-hydroxyethyl-2-pyrrolidone and ε-caprolactam.

24. The ink for ink jet recording according to claim 21, wherein the ureas are at least one selected from urea, thiourea, ethyleneurea and 1,3-dimethyl-2-imidazolidinone.

25. The ink for ink jet recording according to claim 21, wherein the saccharides are at least one selected from maltose, solbitose, gluconolacton and maltose.

26. The ink for ink jet recording according to claim 1, wherein the ink is used under conditions in which a volume (Mj) of one droplet of the ink is 5 pl to 43 pl, and a velocity (Vj) of the ink droplet is 6 m/sec to 20 m/sec, a frequency is 1 KHz or more, and a resolution is 300 dpi or more under one-pass printing mode.

27. An ink for ink jet recording comprising:
(1) at least one of a) self-dispersible organic colorants having at least one hydrophilic group directly bonded to surfaces of the organic colorants and b) self-dispersible organic colorants having at least one hydrophilic group bonded to surfaces of the organic colorants via another atom group;
(2) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane;
(3) at least one of a) a polyols having at least 8 carbon atoms and b) a glycolether;
(4) at least one of a) anionic surfactants and b) non-ionic surfactants; and
(5) water-soluble organic solvent and water,
wherein the ink has a viscosity of 5 mPa·sec or more at 25° C.

28. The ink for ink jet recording according to claim 27, wherein the hydrophilic group comprises any one of groups selected from the groups expressed by the following formulae:

—COOM, —SO$_3$M, —SO$_2$NH$_2$
—PO$_3$HM, —PO$_3$M$_2$, —SO$_2$NHCOR
—NH$^{30}$$_3$, —NR$^{30}$$_3$,

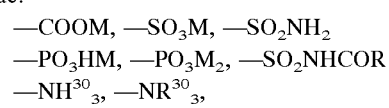
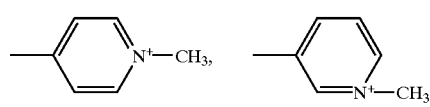

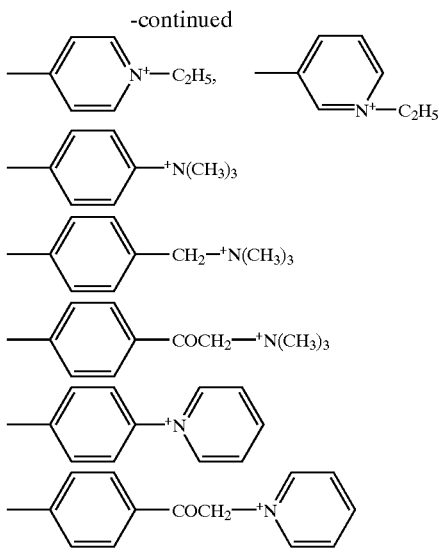

in which M represents a hydrogen atom, alkali metal, ammonium or organic ammonium, and R represents an alkyl group having 1 to 12 carbon atom(s), a phenyl group which may be substituted or a naphthyl group which may be substituted.

29. The ink for ink jet recording according to claim 27, wherein the another atom group is a phenyl group which may be substituted or a naphthyl group which may be substituted.

30. An ink set for ink jet recording comprising a black ink and at least one color ink, in which the black ink and the color ink comprises:
(1) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane;
(2) a colorant;
(3) at least one of a) a polyols having 8 to 11 carbon atoms and b) a glycolether;
(4) at least one of a) anionic surfactants and b) non-ionic surfactants; and
(5) water-soluble organic solvent and water, wherein the colorant is contained in an amount of 6% by weight or more based on the total weight of the ink and the ink has a viscosity of 5 mPa·sec or more at 25° C., the black ink comprises a self-dispersible colorant as the colorant, and the color ink comprises a polymer emulsion comprising a fine polymeric particles and a water-insoluble or poorly soluble colorant as the colorant.

31. A method for ink jet recording comprising:
a step for ejecting ink droplets by applying energy to an ink for ink jet recording;
wherein the ink comprises;
(1) a humectant which comprises at least one substance selected from glycerin, 1,3-butanediol, triethyleneglycol, 1,6-hexanediol, propyleneglycol, 1,5-pentanediol, diethyleneglycol, dipropyleneglycol, trimethylolpropane and trimethylolethane;
(2) a colorant;
(3) at least one of a) a polyols having 8 to 11 carbon atoms and b) a glycolether; and
(4) at least one of a) anionic surfactants and b) non-ionic surfactants, and the colorant is contained in an amount of 6% by weight or more based on the total weight of the ink having a viscosity of 5 mPa·s or more at 25° C.

32. The method for ink jet recording according to claim 31, wherein the energy is thermal energy.

33. The method for ink jet recording according to claim 31, wherein the energy is dynamic energy.

34. The method for ink jet recording according to claim 31, wherein the recording is performed in a one-pass printing mode under conditions of:
a volume (Mj) of one droplet of the ink is 5 to 43 pl, and a velocity (Vj) of the ink droplet is 6 to 20 m/sec, a frequency of 1 kHz or more and resolution of 300 dpi or more.

35. A method for ink jet recording comprising:
a step for using an ink for ink jet recording and an ink jet recording apparatus;
wherein the ink for ink for ink jet recording comprises;
(1) at least one of a) self-dispersible organic colorants having at least one hydrophilic group directly bonded to surfaces of the organic colorants and b) self-dispersible organic colorants having at least one hydrophilic group bonded to surfaces of the organic colorants via another atom group;
(2) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane;
(3) at least one of a) a polyols having at least 8 carbon atoms and b) a glycolether;
(4) at least one of a) anionic surfactants and b) non-ionic surfactants; and
(5) water-soluble organic solvent and water,
and the ink has a viscosity of 5 mPa·s or more at 25° C.; and the ink jet recording apparatus comprises an ink control coating formed on a nozzle plate of a recording head installed on a main body or an ink cartridge of the ink jet recording apparatus by common plating.

36. An ink cartridge for ink jet recording which accommodates an ink for ink jet recording, the ink for ink jet recording comprising:
(1) at least one of a) self-dispersible organic colorants having at least one hydrophilic group directly bonded to surfaces of the organic colorants and b) self-dispersible organic colorants having at least one hydrophilic group bonded to surfaces of the organic colorants via another atom group;
(2) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane;
(3) at least one of a) a polyol having at least 8 carbon atoms and b) a glycolether;
(4) at least one of a) anionic surfactants and b) non-ionic surfactants; and
(5) water-soluble organic solvent and water,
wherein the ink has a viscosity of at least 5 mPa·s or more at 25° C.

37. The ink cartridge according to claim 36, further comprising an ink jet recording head for ejecting the ink for ink jet recording.

38. The ink cartridge according to claim 37, wherein the ink jet recording head has an ink control coating formed on a nozzle plate by common plating.

39. The ink cartridge according to claim 37, wherein the ink jet recording head has a nozzle diameter of 30 µm or less.

40. An ink jet recording apparatus comprising:
- an ink cartridge for accommodating an ink for ink jet recording;
- a recording unit having an ink jet recording head for ejecting the ink in a droplet by applying energy;
- wherein the ink for ink jet recording comprises:
  - (1) at least one of a) self-dispersible organic colorants having at least one hydrophilic group directly bonded to surfaces of the organic colorants and b) self-dispersible organic colorants having at least one hydrophilic group bonded to surfaces of the organic colorants via another atom group;
  - (2) at least one humectant selected from glycerin, 1,3-butandiol, triethylene glycol, 1,6-hexanediol, propyleneglycol, 1,5-pentanediol, diethyleneglycol, dipropyleneglycol, trimethylolpropane and trimethylolethane;
  - (3) at least one of a) a polyols having at least 8 carbon atoms and b) a glycolether;
  - (4) at least one of a) anionic surfactants and b) non-ionic surfactants; and
  - (5) water-soluble organic solvent and water;
- and the ink has a viscosity of 5 mPa·s or more at 25° C.

41. The ink jet recording apparatus according to claim 40, wherein the ink jet recording head has an ink control coating formed on a nozzle plate by common plating.

42. The ink cartridge according to claim 40, wherein the ink jet recording head has a nozzle diameter of 30 µm or less.

43. A recorded article obtainable by using an ink for ink jet recording and an ink jet recording apparatus: wherein the ink jet recording apparatus comprises; an ink cartridge for accommodating the ink for ink jet recording;
- a recording unit having an ink jet recording head for ejecting the ink in a droplet by applying energy; the ink for ink jet recording comprises:
  - (1) at least one of a) self-dispersible organic colorants having at least one hydrophilic group directly bonded to surfaces of the organic colorants and b) self-dispersible organic colorants having at least one hydrophilic group bonded to surfaces of the organic colorants via another atom group;
  - (2) at least one humectant selected from glycerin, 1,3-butandiol, triethyleneglycol, 1,6-hexanediol, propyleneglycol, 1,5-pentanediol, diethyleneglycol, dipropyleneglycol, trimethylolpropane and trimethylolethane;
  - (3) at least one of a) a polyols having at least 8 carbon atoms and b) a glycolether;
  - (4) at least one of a) anionic surfactants and b) non-ionic surfactants; and
  - (5) water-soluble organic solvent and water;
- the ink has a viscosity of 5 mPa·s or more at 25° C.

* * * * *